United States Patent
Perkins, II

(10) Patent No.: US 12,209,378 B2
(45) Date of Patent: Jan. 28, 2025

(54) STABILIZER PAD AND ASSEMBLY

(71) Applicant: RAPTOR TECH, INC, Downers Grove, IL (US)

(72) Inventor: Paul S. Perkins, II, Downers Grove, IL (US)

(73) Assignee: RAPTOR TECH, INC., Downers Grove, IL (US)

( * ) Notice: Subject to any disclaimer, the term of this patent is extended or adjusted under 35 U.S.C. 154(b) by 0 days.

(21) Appl. No.: 18/252,157

(22) PCT Filed: Nov. 9, 2021

(86) PCT No.: PCT/US2021/058682
§ 371 (c)(1),
(2) Date: May 8, 2023

(87) PCT Pub. No.: WO2022/099218
PCT Pub. Date: May 12, 2022

(65) Prior Publication Data
US 2024/0003113 A1    Jan. 4, 2024

Related U.S. Application Data

(60) Provisional application No. 63/111,607, filed on Nov. 9, 2020.

(51) Int. Cl.
*A47B 91/00*    (2006.01)
*B66C 23/78*    (2006.01)
(Continued)

(52) U.S. Cl.
CPC .............. *E02D 27/44* (2013.01); *B66C 23/78* (2013.01); *E02F 9/085* (2013.01)

(58) Field of Classification Search
CPC .......... E02D 27/44; B66C 23/78; E02F 9/085; B60S 9/02
See application file for complete search history.

(56) References Cited

U.S. PATENT DOCUMENTS 2,931,463 A * 4/1960 Stansbury ................ B60D 1/66
188/32
3,415,475 A * 12/1968 Goodman .............. F16M 11/22
248/910

(Continued)

FOREIGN PATENT DOCUMENTS

GB    2501698 A    6/2013

OTHER PUBLICATIONS

"Mytee Medium Outrigger Pad 18"×18"×1.5" Thick for Crane, Wrecker, Tow Truck, Service Truck—Black (2 Pack)" (Amazon) Sep. 4, 2019 (Sep. 4, 2019) <URL https://www.amazon.com/Pack-Mytee-Medium-Outrigger-Black/dp/B07XC3BJMW?th=1>.

(Continued)

*Primary Examiner* — Amy J. Sterling
(74) *Attorney, Agent, or Firm* — REDROC IP LLC; Allison M. Corder

(57) ABSTRACT

An ergonomic stabilizer pad and ergonomic assembly that stabilizes equipment—e.g., cranes or vehicles with outriggers—during use as well as protects the ground surface on which the equipment is placed. The stabilizer pad includes an ergonomic handle and arrangement. An ergonomic stabilizer pad assembly comprises modular components that divide the weight of the assembly between individual components. Each component can be separately transported and a stabilizer pad assembly quickly and easily constructed and deconstructed. Furthermore, the ergonomic stabilizer pad assembly compensates for deflection of the pad that occurs during use and may be used with existing stabilizer pads. The invention eases lifting tasks associated with transporting and positioning stabilizer pads and may reduce the incidence of user injuries. According to the invention, any size pad, even large sizes with a large weight, can be easily handled.

20 Claims, 19 Drawing Sheets

(51) Int. Cl.
*E02D 27/44* (2006.01)
*E02F 9/08* (2006.01)

(56) References Cited

U.S. PATENT DOCUMENTS

| | | | | |
|---|---|---|---|---|
| 4,474,387 | A * | 10/1984 | Maranell | B62H 1/00 254/DIG. 1 |
| 4,530,504 | A * | 7/1985 | Long, Jr. | G06F 3/0338 248/346.03 |
| D282,241 | S * | 1/1986 | Sauber | D8/373 |
| 5,419,524 | A * | 5/1995 | Evans | B60S 9/02 248/346.4 |
| 7,243,450 | B2 * | 7/2007 | Dicke | G09F 15/0056 40/607.1 |
| 8,814,121 | B2 * | 8/2014 | Koberg | B60S 9/02 248/910 |
| 9,254,821 | B2 | 2/2016 | Koberg | |
| 9,550,657 | B2 * | 1/2017 | Koberg | E02F 9/085 |
| 9,670,639 | B2 | 6/2017 | Reeve et al. | |
| 10,343,656 | B2 * | 7/2019 | Grosz | B60T 3/00 |
| 2005/0017223 | A1 * | 1/2005 | Lucas | B66F 13/00 254/1 |
| 2009/0072525 | A1 * | 3/2009 | Banks | B66C 23/78 248/188.8 |
| 2014/0319315 | A1 | 10/2014 | Koberg | |
| 2016/0325974 | A1 | 11/2016 | Wilson et al. | |
| 2019/0084812 | A1 | 3/2019 | Anzola | |
| 2020/0087050 | A1 * | 3/2020 | Seichei | B65D 21/0204 |
| 2020/0130889 | A1 | 4/2020 | Perkins, II | |

OTHER PUBLICATIONS

"Bamboo Crane Mats—Vietnam" (BWG) Jan. 22, 2020 (Jan. 22, 2020) <URL https://web.archive .org/web/20200122072647/http://www.bwg.vn/en/bamboo-crane-mats-vietnam-p21.html>.

* cited by examiner

STABILIZER PAD AND ASSEMBLY

CROSS-REFERENCE TO RELATED APPLICATIONS

This application claims the benefit of Application Ser. No. 63/111,607 filed Nov. 9, 2020.

FIELD OF THE INVENTION

The invention relates generally to the field of construction and more particularly, the invention relates to a stabilizer pad and assembly that stabilizes equipment—e.g., heavy construction equipment such as cranes or any equipment with an outrigger—during use as well as protects the ground surface on which the equipment is placed.

BACKGROUND OF THE INVENTION

Stabilizer pads are used with equipment such as cranes or equipment with outriggers. Some stabilizer pads are also known as crane mats, crane pads, outrigger pads, outrigger mats, ground bearing mat, ground bearing pad. A stabilizer pad is used to stabilize the equipment and protect the ground surface on which the equipment is placed. The pad stabilizes the equipment during use to prevent the equipment from moving, e.g., sinking through the ground surface, toppling over, etc. The pad prevents the equipment from breaking through the ground surface—brick, rock, concrete, asphalt, sand, soil, or any other material—and damaging the equipment.

Stabilizer pads provide a solid, even surface creating a sturdy base during equipment operation. Stabilizer pads additionally distribute concentrated loads or disperse weight from the outrigger. Stabilizer pads can be extremely heavy in weight (e.g., over 50 pounds) and are known to be transported by rolling along its edge. Heavy pads may be difficult to transport in this fashion and come with a risk of becoming unsteady and toppling over.

A stabilizer pad can also be transported by being manually pulled or lifted by a machine, both which may further require lanyards or straps secured to the pad. Some pads have handles to assist with transporting them. These handles may be constructed of rope that is secured through holes in the mat, but the integrity of rope handles easily deteriorate over repeated use and eventually break apart. Handles constructed of cable are known to be attached using pins through anchor holes, which may become insecure risking detachment from the mat. This may be particularly problematic if detachment of the handle from the pad occurred while lifted and moved by a machine. Furthermore, certain known cable handles are positioned along the perimeter edge of the pad, but forms a small or low clearance (e.g., 0-¾ inches) with the ground surface. This makes it difficult for a user to position his or her hand around the handle.

Another problem with current stabilizer pads is that a portion of the pad deflects upwardly from the ground surface during use which compromises the amount of load the pad can support. Specifically, the more a stabilizer pad deflects, the less load the pad can support. And increasing the size of the pad to account for the deflection is not a desirable solution since this increases the weight of the pad.

What is needed is an improved stabilizer pad, i.e., one that is easy to transport, includes ergonomic features, and compensates for deflection of the pad that occurs during use. The invention satisfies this need.

BRIEF SUMMARY OF THE INVENTION

Although the invention is described with respect to a crane, any vehicle with an outrigger or other support structure of the equipment is contemplated. The invention is directed to an ergonomic stabilizer pad and ergonomic assembly that stabilizes equipment—e.g., cranes or vehicles with outriggers—during use as well as protects the ground surface on which the equipment is placed. The stabilizer pad includes an ergonomic handle and ergonomic handle arrangement along the outer perimeter of the pad. An ergonomic stabilizer pad assembly comprises modular components configured to be "nested" together—i.e., placed or stored one inside the other—that divides the weight of the assembly between individual components. Each component can be separately transported and a stabilizer pad assembly quickly and easily constructed and deconstructed. Furthermore, the ergonomic stabilizer pad assembly compensates for deflection of the pad that occurs during use and may be used with existing stabilizer pads. The invention eases lifting tasks associated with transporting and positioning stabilizer pads and may reduce the incidence of user injuries. According to the invention, any size pad, even large sizes with a large weight, can be easily handled.

According to one embodiment of the invention, the stabilizer pad comprises a pad component with ergonomic handle and arrangement. Specifically, the handle arrangement includes handles that alternate between being located near a first surface of the pad component and an opposing second surface of the pad component. When the pad component is placed on a ground surface, gaps are created between the lower part of the handle and the ground surface. The handles located near one surface provide a larger gap than the handles located near the opposing surface. The gaps allow space beneath and above the handle for a user to position his or her hand.

Furthermore, the handles may be integrated with the pad component. For example, the handles may be insert molded into the pad or machined from the pad material.

In addition, the stabilizer pad includes a notch with a body segment dedicated for attaching a lanyard (with ergonomic handle) for transporting the pad.

The stabilizer pad may further include a product tag or label that may include information such as a serial number model number, date of manufacture, or a machine readable code such as barcode or QR code. It is contemplated that a machine readable code may be used with an Internet website or smart phone application. The label may further cover and seal a pocket configured to contain devices.

The devices may provide data such as location, identification, certification, recertification, current load weight, or total load weight the pad has supported during its lifecycle. The devices to provide the data may operate using short-range wireless communications such as RFID, NFC, and Bluetooth. The devices may operate using satellite-based systems such as GPS.

According to another embodiment of the invention, the stabilizer pad comprises an assembly of separate components—referred to as the inner pad component and outer pad component. The inner pad component is removable from the outer pad component, which divides the weight of traditional crane mats. This makes it easier to transport and maneuver the pad, particularly when performed by hand (by rolling along the perimeter edge).

In certain embodiments, both sides of the inner pad component can be used. The first side comprises a planar surface and the second side comprises a surface with a portion elevated to a higher position from an un-elevated portion. The un-elevated portion stabilizes the pad so that elevated portion may be used to receive an outrigger. When flipped or inverted, this un-elevated portion may be received by an opening within an outer pad component. It is contemplated that the inner pad component may also include a pocket for receiving devices as described above.

The pad component of the stabilizer pad may be manufactured of any contemplated material, such as wood, plywood, metal, steel, rubber, plastic, bamboo, concrete, aluminum, fiberglass, thermoplastics, to name a few. It is contemplated that the inner pad component may be manufactured from either the same or different material as the pad component. It is also contemplated that one or more components may include a slip resistant surface to assist with preventing the outrigger from slipping.

According to one embodiment of the invention, the pad component is manufactured from bamboo. Bamboo is a sustainable resource that has been found to have a tensile strength that is greater than steel. It is contemplated that a composite material may be constructed from layers fabricated from bamboo, which may be laminated or adhered together such as by adhesive or by any other known method.

According to another embodiment of the invention, the stabilizer pad assembly comprises an auxiliary component. The auxiliary component compensates for deflection of the pad component, including the combined inner pad component and outer pad component, so that the load the assembly can support is not compromised.

In one embodiment, the auxiliary component includes a cavity element for receiving a pad component, e.g., a pad component or combined outer pad component and inner pad component. It is contemplated that the auxiliary component is configured to work with existing pads as well as with a multitude of different inner pads depending on the equipment, task, and ground conditions. In another embodiment, the auxiliary component and pad component are integrated as a unitary component.

When the assembly receives a load, a continuous base portion of the auxiliary component moves to a position parallel to the ground surface. This compensates for the deflection of the inner pad by distributing the load to the continuous base portion extending around the perimeter edge of the auxiliary component. As a result, the amount of the load the assembly can withstand is not compromised. The auxiliary component includes a continuous rim with scallop portions and an ergonomic handle and arrangement. The scallop portions assist with control of the auxiliary component when transporting and maneuvering the pad such by rolling along the periphery edge. Preferably, the auxiliary component is manufactured of rubber or a rubber/metal combination, but any material is contemplated that assist with compensating for deflection of the pad component during use.

According to another embodiment of the invention, the stabilizer pad assembly comprises a reinforcement component. The reinforcement component may comprise any pliable or rigid material, or a combination of both. Examples of pliable material may include rubber. Examples of rigid material may include spring steel or fiber reinforced polymer (FRP) such as carbon fiber reinforced polymer (CFRP) or glass fiber reinforced polymer (GFRP). Layers of material can be glued or laminated together into a single sheet, for example rubber and FRP or spring steel, i.e., rubber backed spring steel. The reinforcement component may be positioned between the ground surface and the bottom of the stabilizer pad or between the pad component and the auxiliary component to protect the pad from abrasion, punctures, increase strength and durability of the assembly, and/or to decrease deflection of the pad.

In embodiments of the invention where the stabilizer pad assembly comprises two or more components, these components may be joined together using one or more lap joint configurations in which the components overlap. It is further contemplated that the lap joint configurations may include a guide element such as an angled surface or a radius such as a ball and socket to assist with aligning the components.

Advantages of a lap joint configuration include that it provides a strong connection between components and may be used to join components made from dissimilar materials. It is also contemplated that other elements may be used to join the components of the invention. For example a strip element may be used to provide an interference fit between components. The strip may be made from any compressible material such as nylon, rubber, foam, etc. Or integrated with one of the components, i.e., pad component, auxiliary component.

Another embodiment of the invention includes an ergonomic handgrip element that may be used with a strap or a lanyard to assist with moving the stabilizer pad or assembly. The handgrip element includes ergonomic characteristics, e.g., size, shape, texture, pattern, material composition, etc. The lanyard including handgrip element is attachable to any of the components of the invention, e.g., the lanyard may be secured to ergonomic handles of the pad component, the inner pad component, or the auxiliary component. The lanyards are used to attach a lifting hook of a machine to move the stabilizer pad or assembly. They may also be used to manually move or drag the stabilizer pad or assembly. The handgrip element is moveable on the lanyard, i.e., the handgrip element includes a through hole for receiving the lanyard and provides sufficient clearance so that the handgrip element can slide to various positions along the lanyard. Therefore, the handgrip element can be used to maneuver the pad or assembly while being easily moveable to avoid interference with a lifting hook.

The invention and its attributes and advantages will be further understood and appreciated with reference to the detailed description below of presently contemplated embodiments, taken in conjunction with the accompanying drawings.

BRIEF DESCRIPTION OF THE FIGURES

The preferred embodiments of the invention are described in conjunction with the attached figures that illustrate embodiments of the invention.

DETAILED DESCRIPTION OF THE INVENTION

Figure 1:
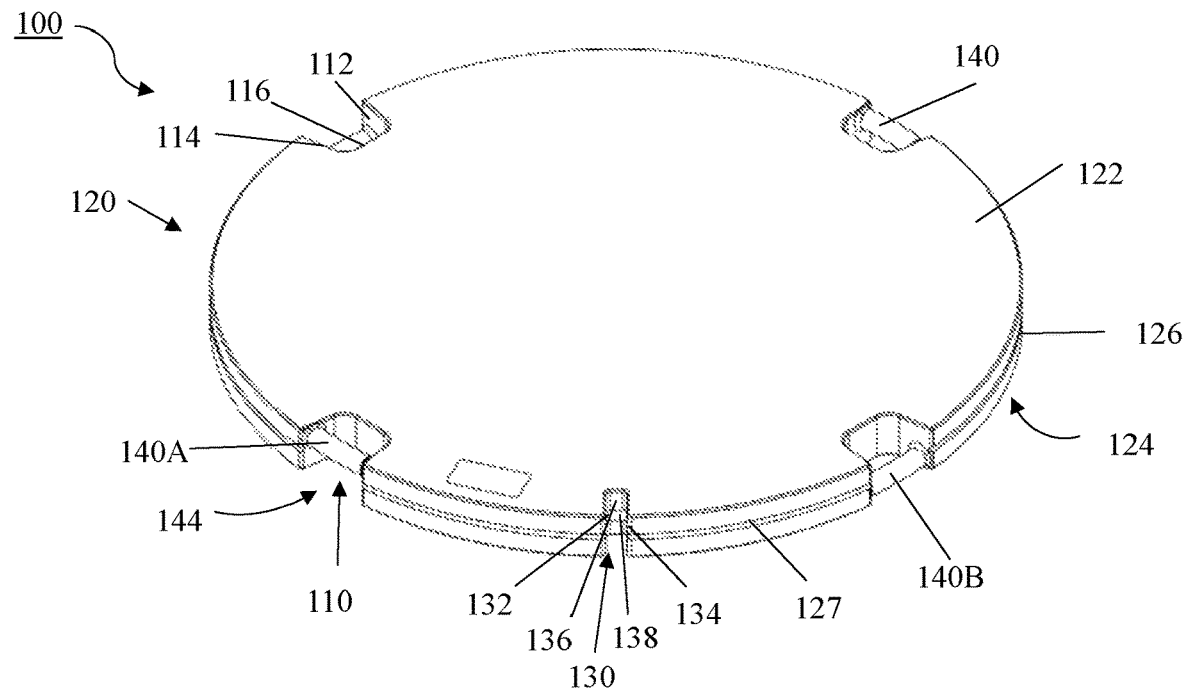
FIG. 1 illustrates an isometric view of a pad component.

An ergonomic stabilizer pad and ergonomic assembly that stabilizes equipment—e.g., cranes or vehicles with outriggers—during use. For purposes of this application the stabilizer pad is shown and described as a circular shape, but any shape is contemplated, e.g., square, rectangle, octagon, etc. However, a circular shape is known to work well for rolling the pad on its edge.

The stabilizer pad includes an ergonomic handle and arrangement. In certain embodiments, the stabilizer pad 100 may include a pad component 120. In certain other embodiments a stabilizer pad assembly 101 may include an outer pad component 180 and an inner pad component 200. The outer pad component 180 can be considered as the pad component 120 with a removable portion, i.e., an inner pad component 200.

Figure 2:
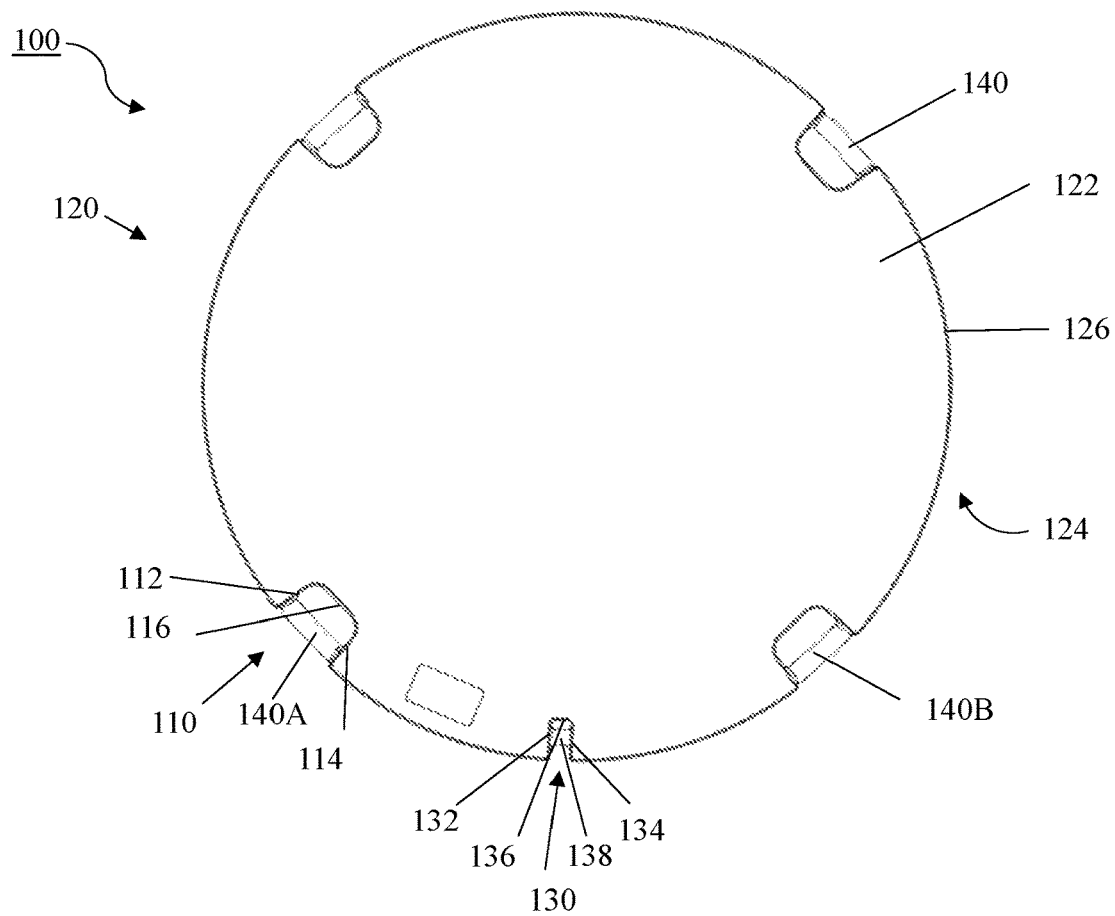
FIG. 2 illustrates a top view of a pad component.
Figure 3:
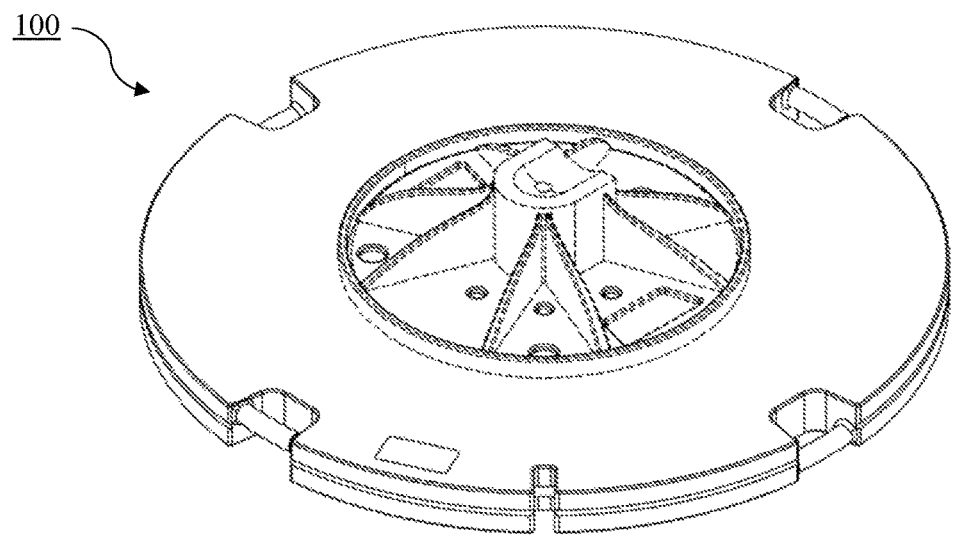
FIG. 3 illustrates an isometric view of a pad component with outrigger.

An embodiment of the invention is shown in FIGS. 1-3. A pad component 120 comprises a first surface 122, an opposing second surface 124, and a side wall surface 126 that forms the perimeter edge of the pad 100.

At least two recess elements 110 are provided in the pad 100, each that house a handle element 140. Although four recess elements 110 are shown, any number greater or equal to two is contemplated. Each recess element 110 is formed inward from the side wall surface 126 toward the center of the pad component 120. The recess element 110 is defined by a first side portion 112, a second side portion 114, both connected by a third side portion 116. A space is formed between the handle 140 and third side portion 116.

The ergonomic handle arrangement includes two or more handle elements 140 that alternate between being located near a first surface 122 and an opposing second surface 124 of the primary pad component 120. When the pad component 120 is placed on a ground surface, gaps 144 are created between the lower part of the handle and the ground surface. As shown, handle element 140A is located near the first surface 122 and provides a larger gap than the handle element 140B located near the opposing second surface 124 to allow space beneath and above the handle for a user to position his or her hand.

The handles are integrated with the pad component 120 such as insert molded into the pad or machined from the pad material. As an example, each handle element 140 may be a ring that is insert molded into the pad component 120.

The pad component may further include a notch element 130 dedicated for attaching a lanyard (with ergonomic handle) for transporting the stabilizer pad. The notch element 130 is formed inward from the side wall surface 126 toward the center of the pad component 120. The notch element 130 is defined by a first side segment 132, a second side segment 134, both connected by a third side segment 136. The notch element 130 includes a body segment 138 that forms a slot with the third side segment 136. A lanyard is connected to the notch element 130 by feeding the lanyard through the slot and securing it about the body segment 138.

The pad component may further include a groove element 127 located on the side wall surface 126. The groove element 127 may extend around all or a portion of the perimeter edge of the pad 100. The groove element 127 may be used for receiving a strip element 170 (see FIG. 27) to provide an interference fit between components.

The stabilizer pad may further include a product tag or label element 150 positioned on the first surface 122, but the label element 150 may also be positioned on the second surface 124 or side wall surface 126. The label element 150 may provide information such as a serial number model number, date of manufacture, or a machine readable code such as barcode or QR code. It is contemplated that a machine readable code may be used with an Internet website or smart phone application.

The label element 150 may further cover and seal a pocket element (described in FIG. 4) positioned on either the first surface 122 or second surface 124. The pocket element may include devices to provide data such as location, identification, certification, recertification, current load weight, or total load weight the pad has supported during its lifecycle. The devices to provide the data may operate using short-range wireless communications such as RFID, NFC, and Bluetooth. The devices may operate using satellite-based systems such as GPS.

FIG. 3 illustrates an isometric view of the pad component 120 with outrigger positioned on the primary pad component 120.

Another embodiment of the stabilizer pad 101 is shown in FIGS. 4-13. In this embodiment, the stabilizer pad 101 comprises an outer pad component 180 with inner pad component 200. An outer pad component 180 comprises a first surface 182, an opposing second surface 184, and a side wall surface 186 that forms the perimeter edge of the pad 180. The outer pad component 180 further includes a receptacle portion 190 configured to receive the inner pad component 200. The outer pad component 180 includes two or more recess elements 110 including handle elements 140 as shown and described above. The outer pad component 180 also may further include a notch element 130 for attaching a lanyard as shown and described above.

An inner pad component 200 comprises an upper surface 202, an opposing lower surface 204, and an edge wall surface 206 that forms the perimeter edge of the inner pad component 200. The inner pad component 200 may include two or more recess elements 110 including handle elements 140 as shown and described above. The inner pad component 200 also may further include a notch element 130 for attaching a lanyard as shown and described above.

Figure 4:
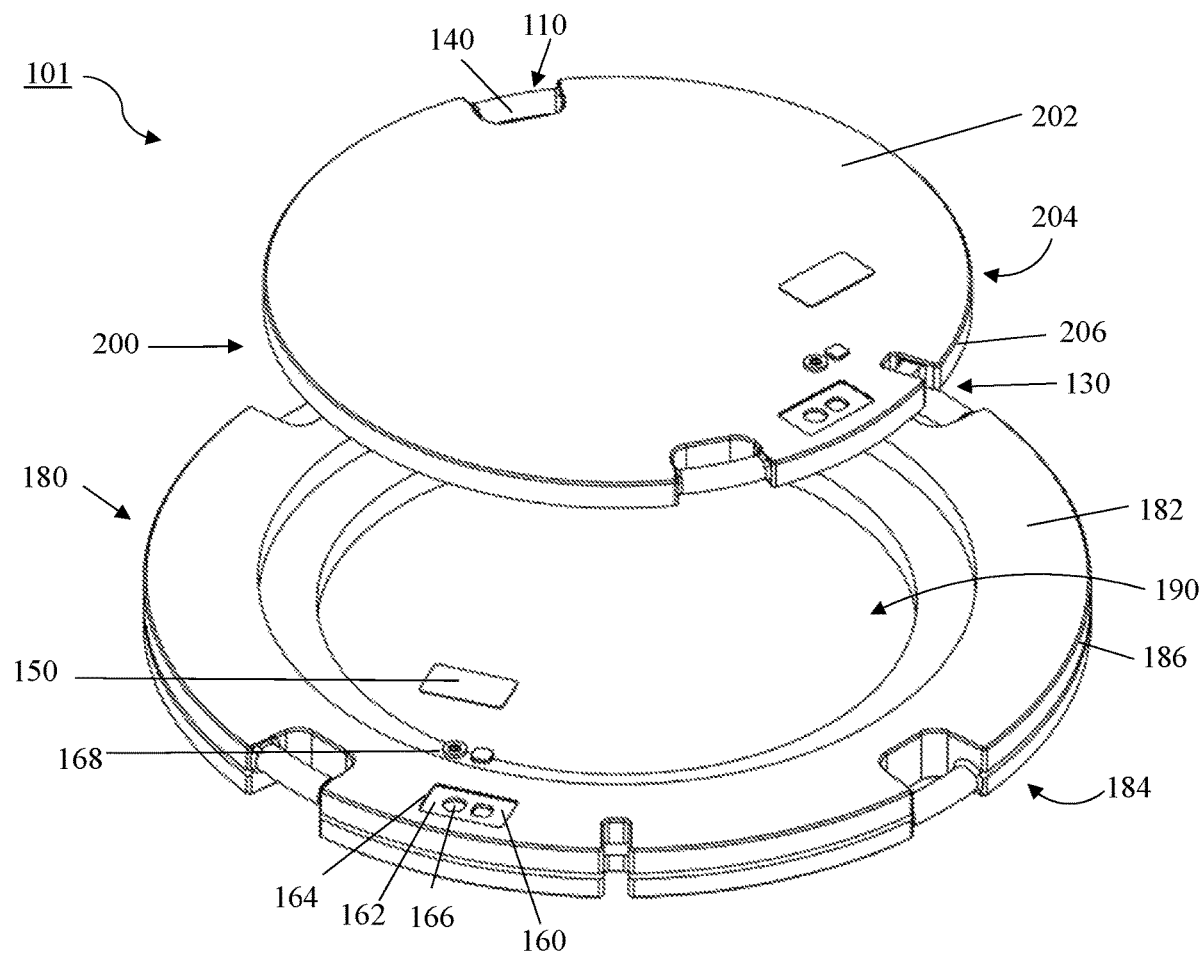
FIG. 4 illustrates an exploded isometric view of an outer pad component including an inner pad component.

As shown in FIG. 4, the outer pad component 180 includes a label element 150 that protects a pocket element 160, which may include devices to provide data such as location, identification, certification, recertification, current load weight, or total load weight the pad has supported during its lifecycle. The pocket element 160 is defined by a base surface 162 distanced from the first surface 182 by side surface 164. Any depth of the pocket element 160 from the first surface 182 is contemplated. The pocket element 160 may further include compartment portions 166 to further secure the devices. The label element 150 may be positioned flush or level with the first surface 182. As shown in FIG. 4, the inner pad component 200 may also include a label element 150 as described above.

Figure 5:
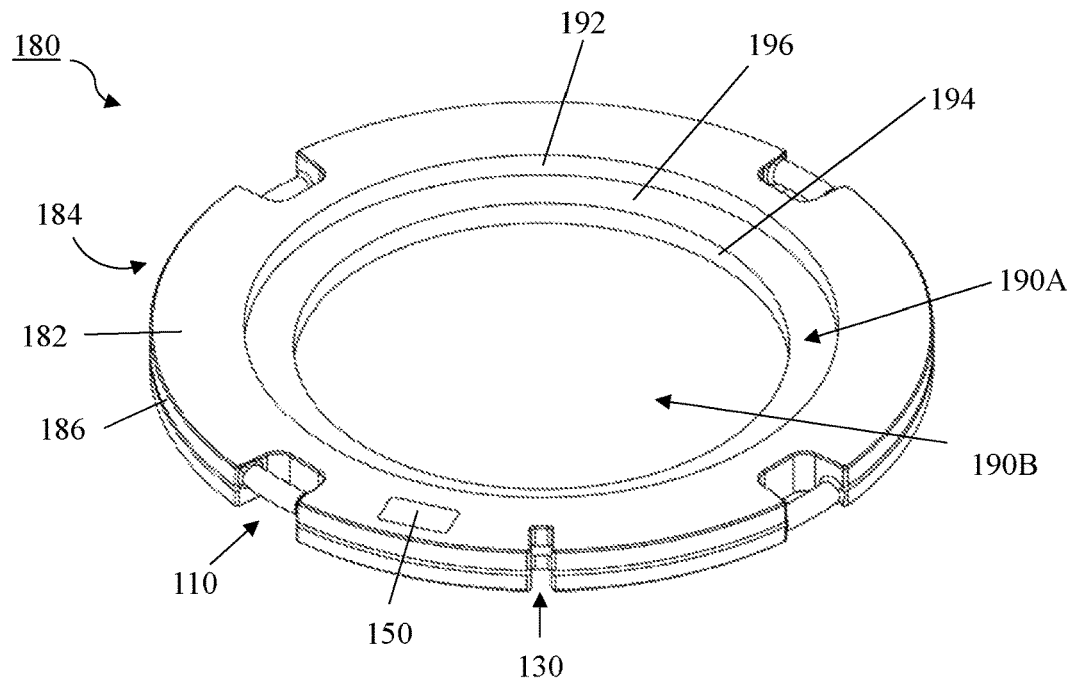
FIG. 5 illustrates an isometric view of an outer pad component.
Figure 6:
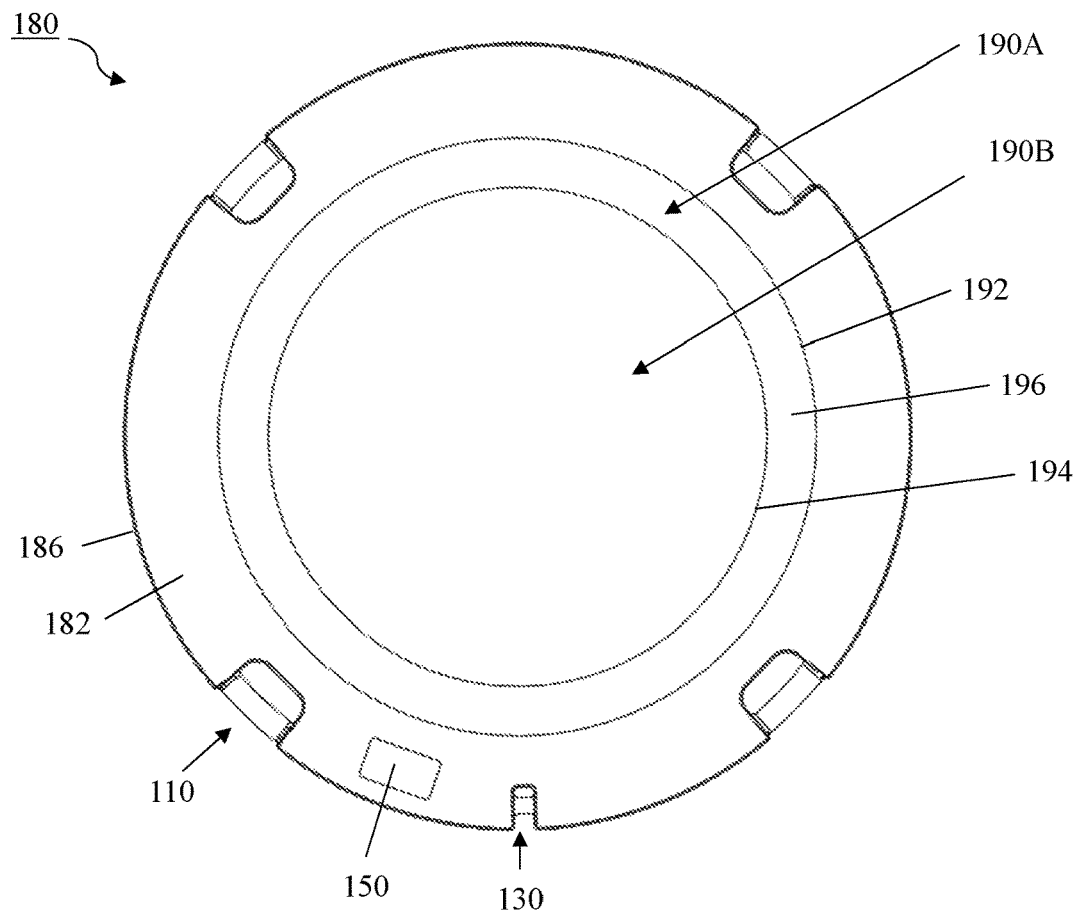
FIG. 6 illustrates a top view of the outer pad component.

As shown in FIGS. 4-6, the receptacle portion 190 is configured to receive the inner pad component 200 and includes surfaces 192, 194, 196. First surface 192 defines a first aperture 190A bound by third surface 196, which is parallel to first surface 182. Second surface 194 defines a second aperture 190B.

Figure 7:
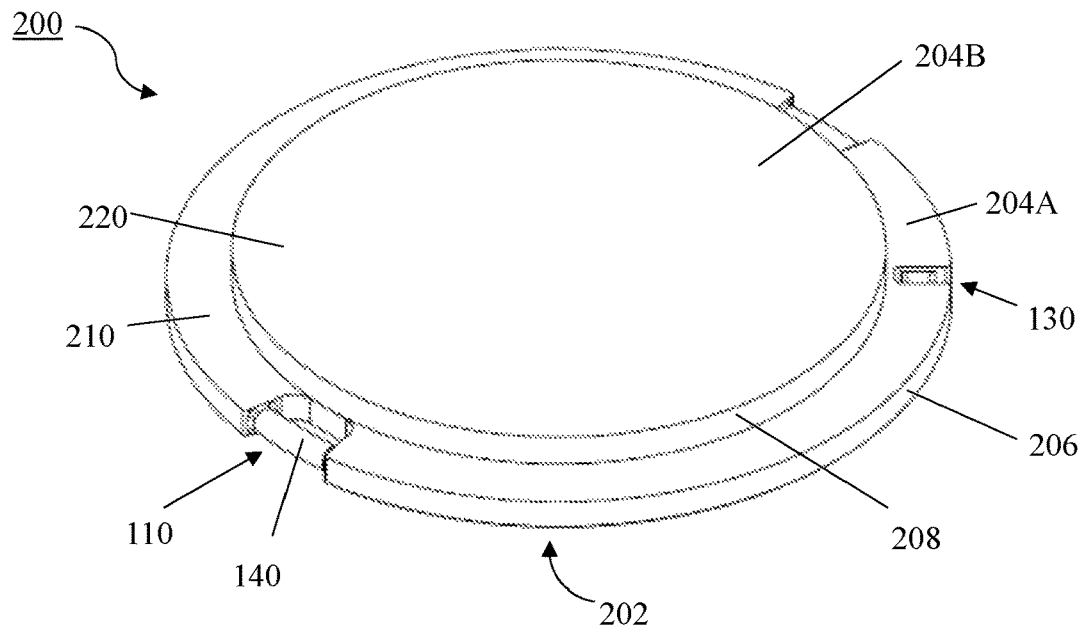
FIG. 7 illustrates an isometric view of the inner pad component.
Figure 8:
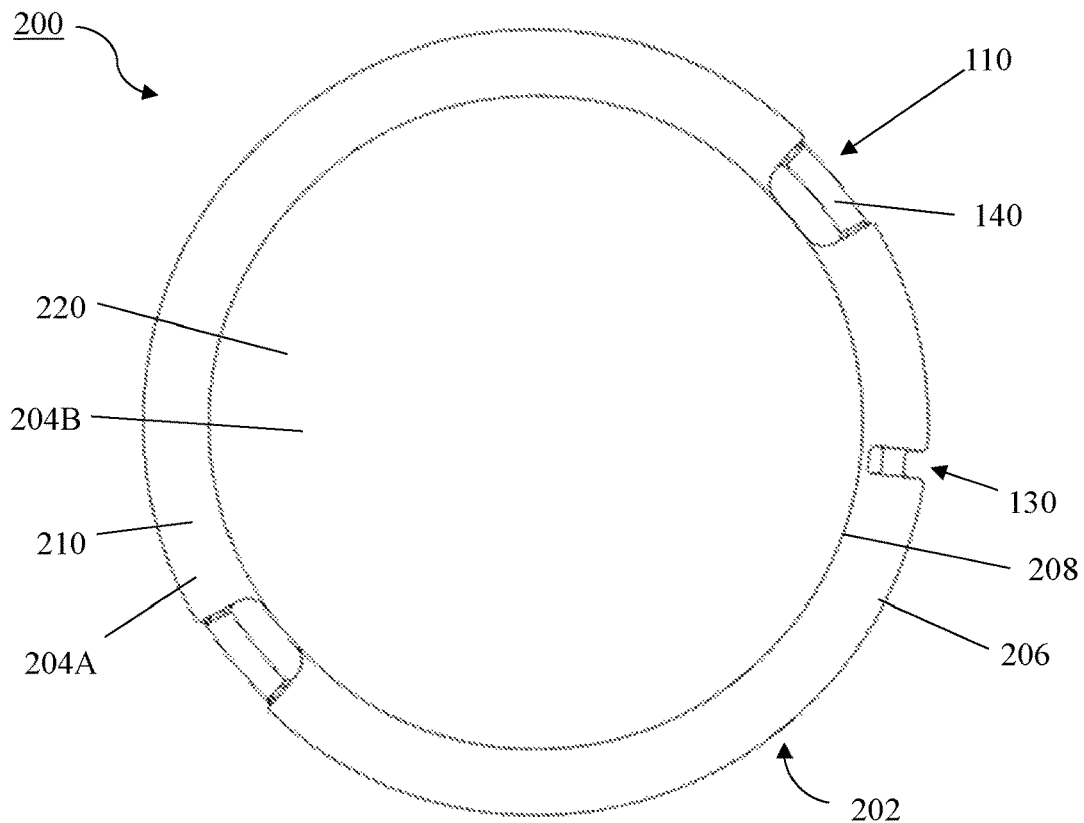
FIG. 8 illustrates a bottom view of the inner pad component.

FIG. 7-8 illustrate the inner pad component 200. In certain embodiments, two side surfaces 206, 208 of the inner pad component can be used. An upper surface 202 is a planar surface and the lower surface 204 comprises a portion 220 elevated to a higher position from an un-elevated portion 210. The lower surface 204 is shown in FIG. 7-8. The lower surface 204 includes an elevated portion 210 and an un-elevated portion 220. The un-elevated portion 210 is formed by edge wall surface 206 and first lower surface 204A. The elevated portion 220 is formed by inner edge wall surface 208 and second lower surface 204B.

Figure 9:
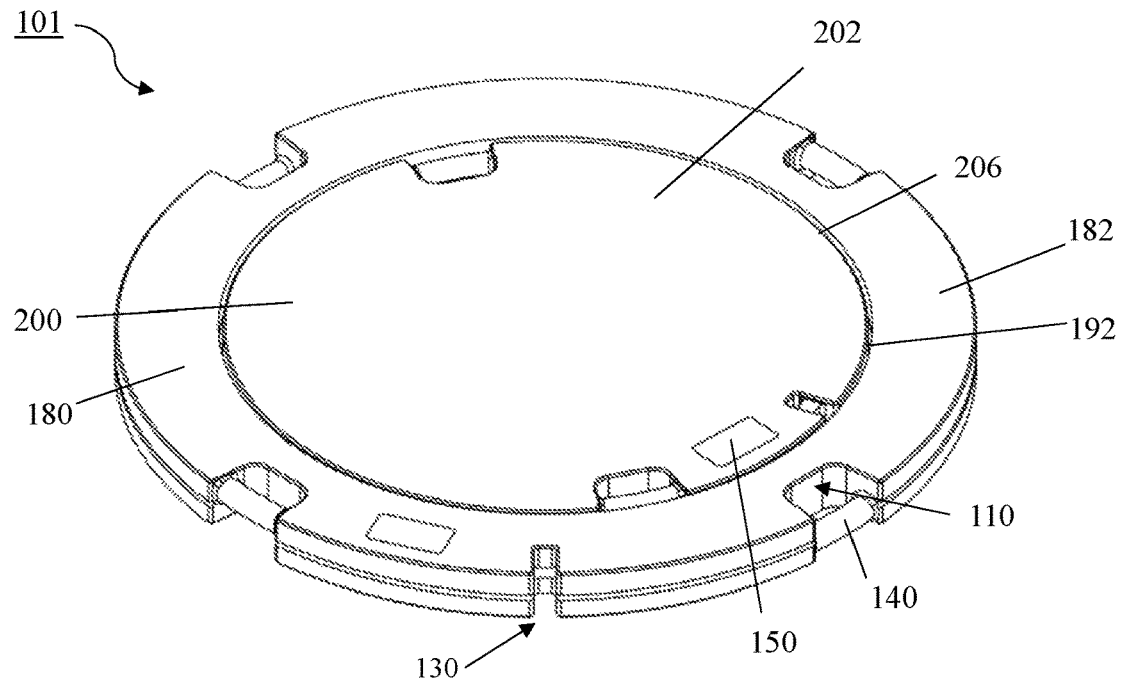
FIG. 9 illustrates an isometric view of the outer pad component assembled with the inner pad component.
Figure 10:
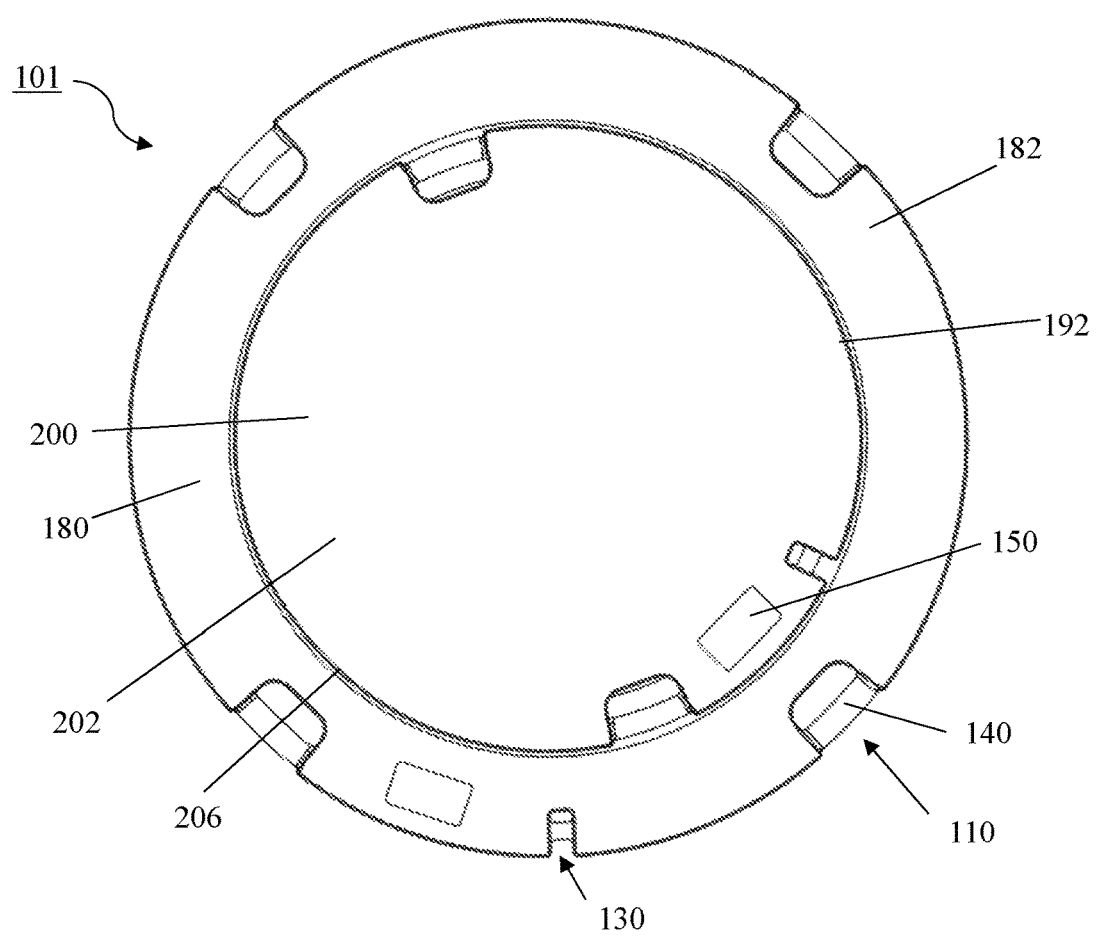
FIG. 10 illustrates a top view of the outer pad component assembled with the inner pad component.
Figure 11:
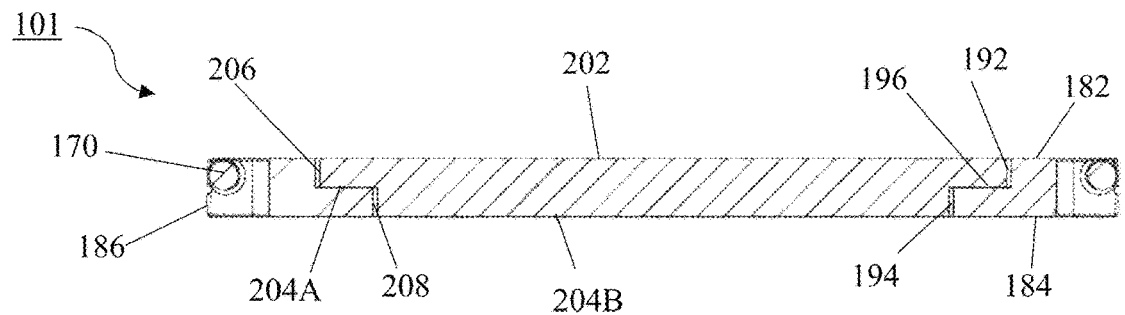
FIG. 11 illustrates a sectional side view of the outer pad component assembled with the inner pad component.

FIGS. 9-11 illustrate the outer pad component 180 assembled with the inner pad component 200. As shown, the inner pad component 200 in positioned within the receptacle portion 190 of the outer pad component 180 using a lap joint configuration. The elevated portion 220 is positioned within the second aperture 190B. Once positioned, the upper surface 202 of the inner pad component 200 and the first surface 182 of the outer pad component 180 are level. As shown in FIG. 11, edge wall surface 206 of the inner pad component 200 is bound by first surface 192 of the outer pad component 180, first lower surface 204A of the inner pad component 200 is bound by the third surface 196 of the outer pad component 180, and inner edge wall surface 208 of the inner pad component 200 is bound by second surface 194 of the outer pad component 180.

Figure 28:
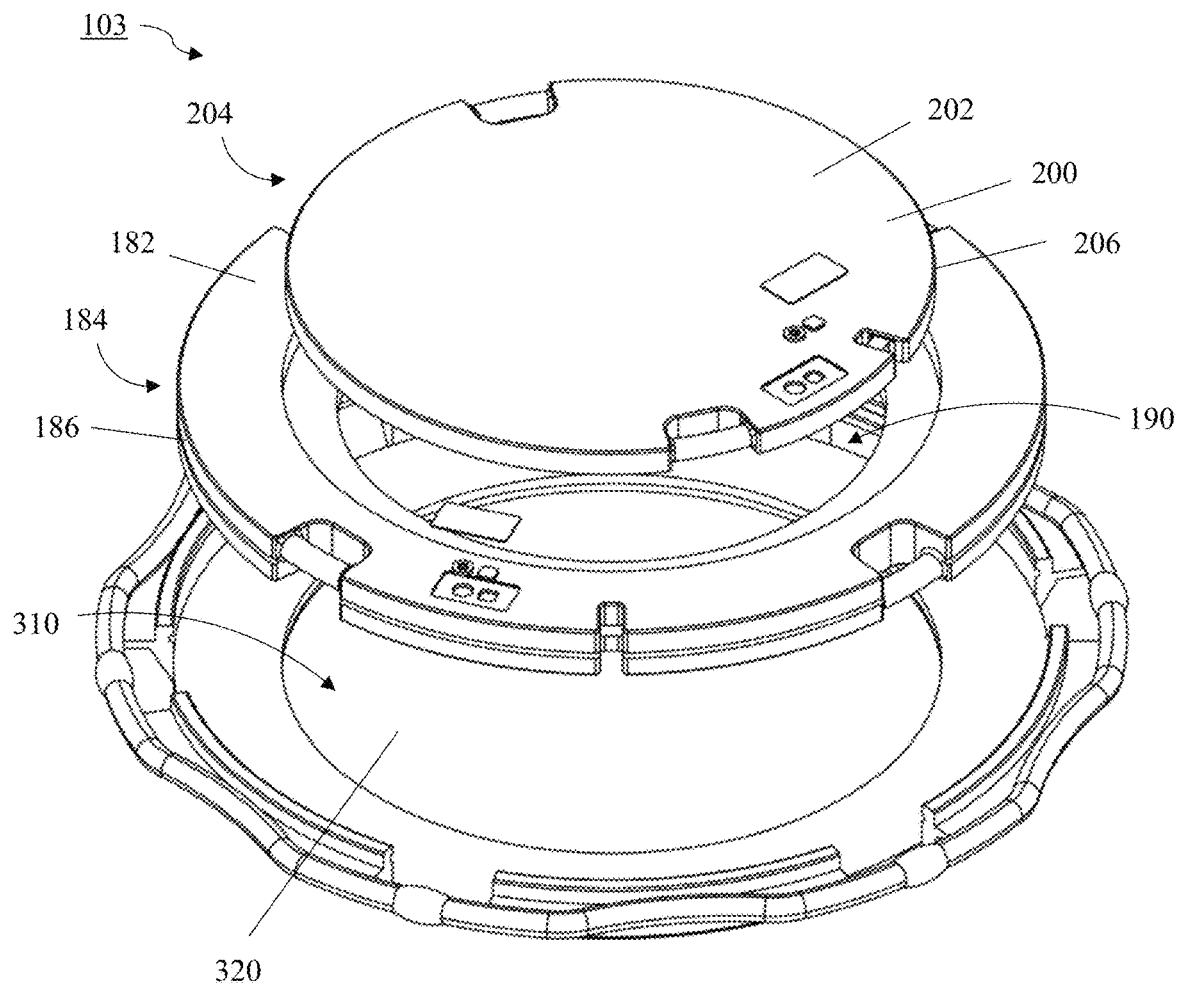
FIG. 28 illustrates an exploded isometric view of the outer pad component, the inner pad component, and the auxiliary component.
Figure 29:
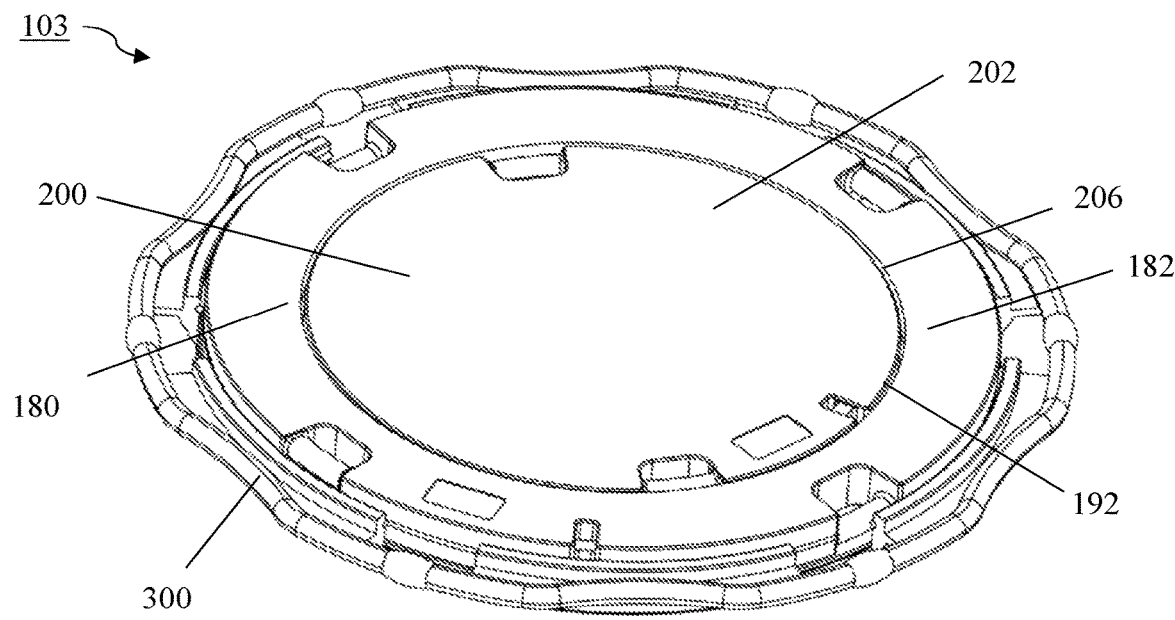
FIG. 29 illustrates an isometric view of the outer pad component assembled with both the inner pad component and the auxiliary component.
Figure 30:
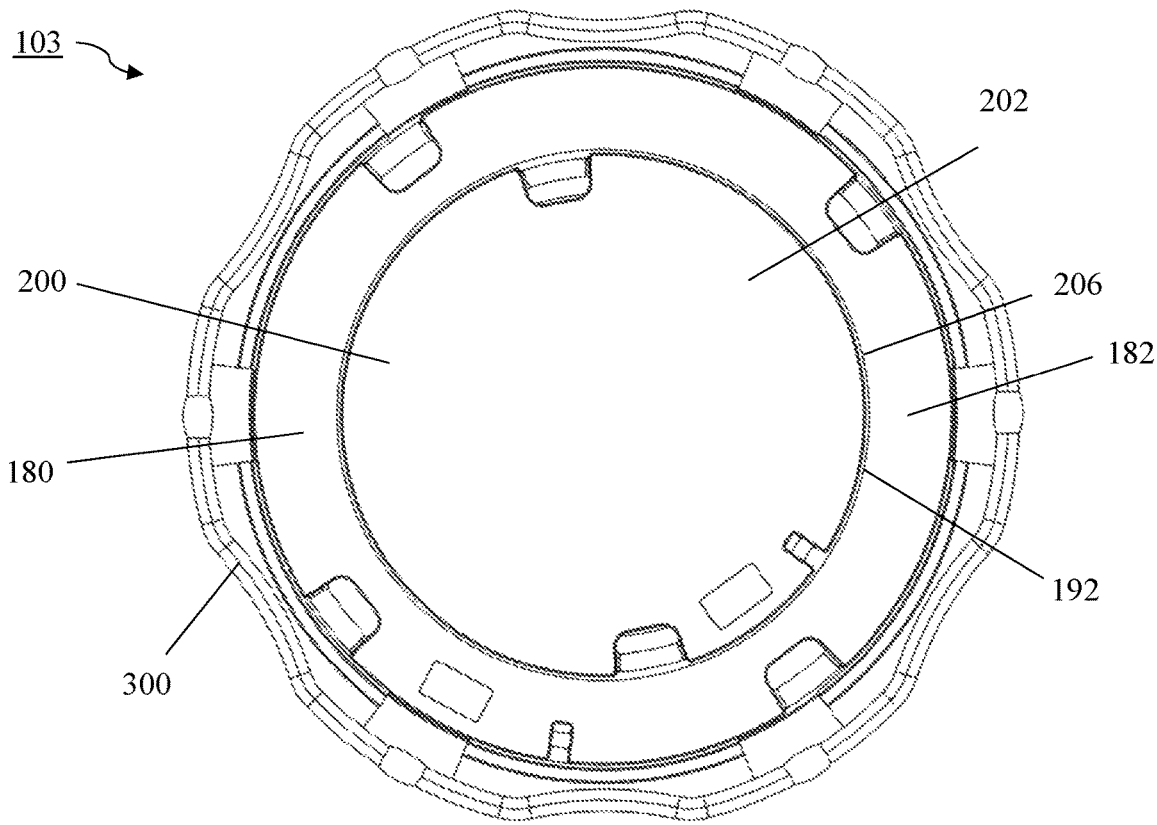
FIG. 30 illustrates a top view of the outer pad component assembled with both the inner pad component and the auxiliary component.

FIG. 11 also illustrates a strip element 170 positioned on the side wall surface 186 of the outer pad component 180. This strip element may assist with securing the stabilizer pad assembly 101 into the auxiliary component 300 (see FIGS. 28-30).

Figure 12:
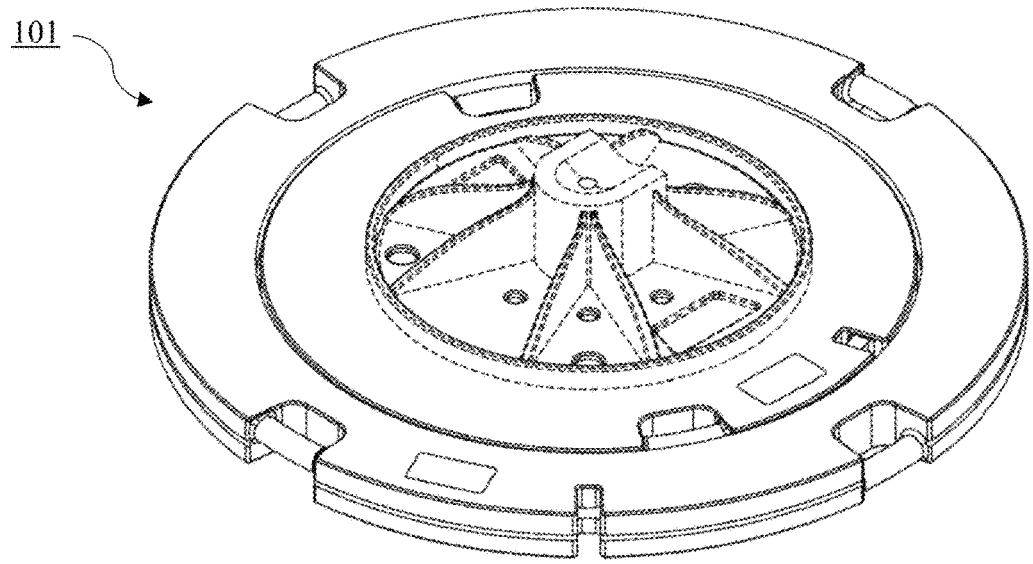
FIG. 12 illustrates an isometric view of the outer pad component assembled with the inner pad component and an outrigger.
Figure 13:
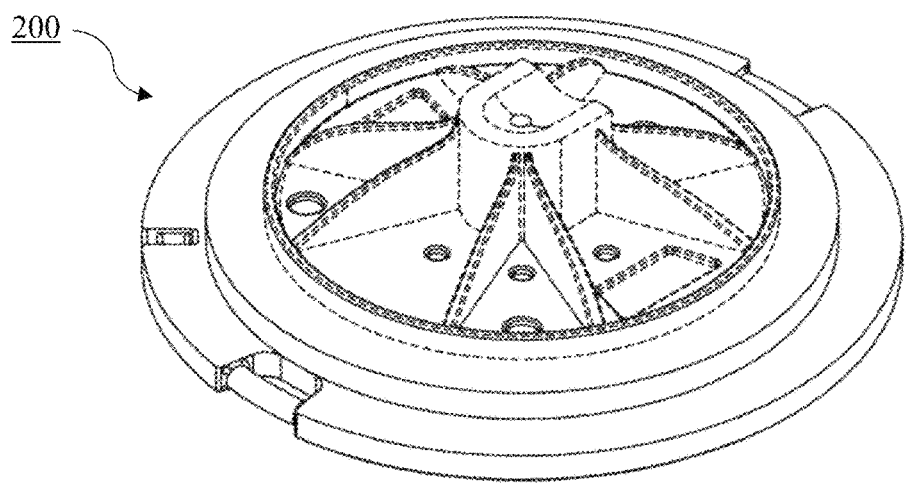
FIG. 13 illustrates an isometric view of the inner pad component with outrigger.

FIG. 12 illustrates an isometric view of the outer pad component 180 assembled with the inner pad component 200 and an outrigger and FIG. 13 illustrates an isometric view of the inner pad component 200 with outrigger. As shown in FIG. 13, upper surface 202 of the inner pad component 200 may be positioned on the ground. The larger surface area of the un-elevated portion 210 acts as a base while the elevated portion 220 receives an outrigger.

Figure 14:
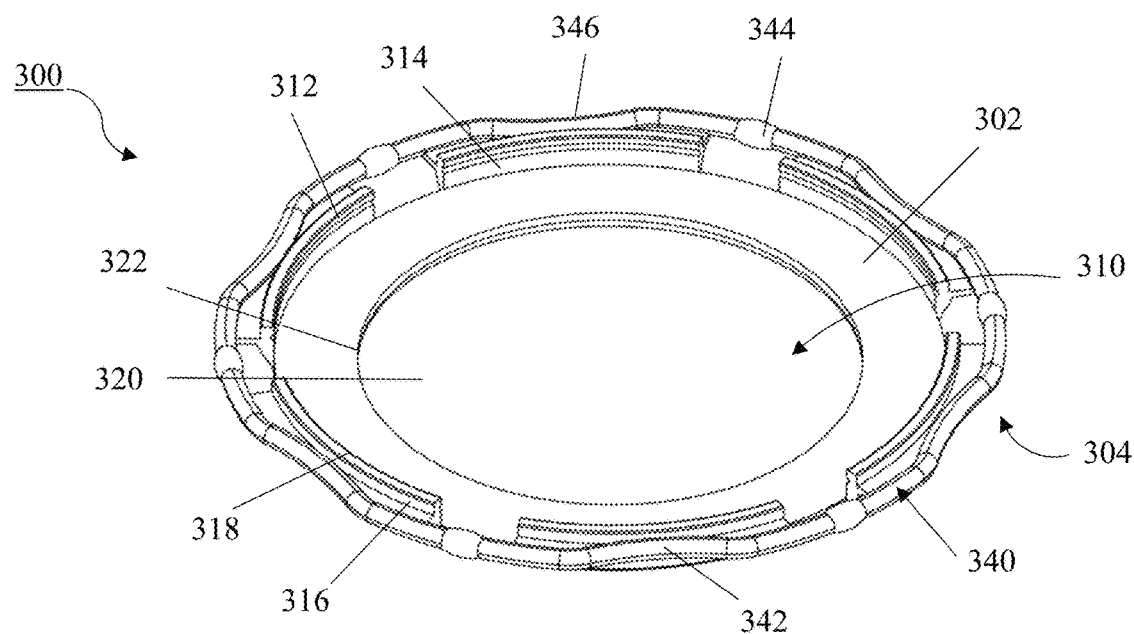
FIG. 14 illustrates an isometric view of an auxiliary component.
Figure 15:
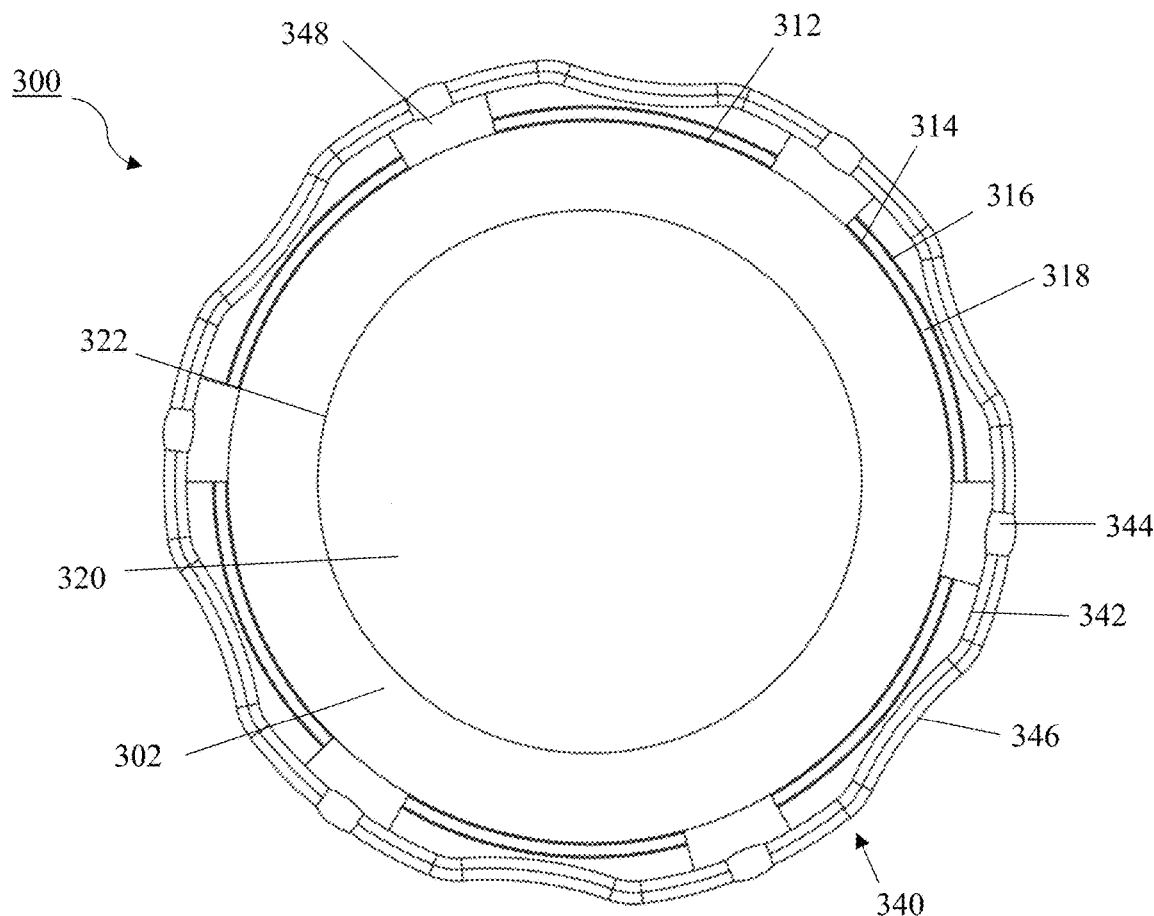
FIG. 15 illustrates a top view of the auxiliary component.

FIGS. 14-15 illustrates an auxiliary component. The auxiliary component 300 compensates for deflection of the pad component that occurs during use and may be used with existing stabilizer pads. The auxiliary component 300 may include a top surface 302 and a bottom surface 304. The auxiliary component 300 includes a cavity element 310 to accept different types of inner pads of various shapes and sizes.

The cavity element 310 is defined by a wall element 312. The wall element 312 includes an inner boundary surface 314, and outer boundary surface 316, and a top boundary surface 318. An aperture 320 is defined by side surface 322. The auxiliary component 300 includes a handle element 340 that comprises a continuous rim portion 342. A plurality of ergonomic handgrip portions 344 and scallop portions 346 are integrated with rim portion 342. The scallop portion assists with control of the auxiliary component when transporting and maneuvering the pad such by rolling along the periphery edge. The rim portion 342 may further include a bolster component to increase strength, for example, a wire or cable may be positioned throughout the rim portion 342. The handle element 340 is integrated with the wall element 312.

Figure 16:
FIG. 16 illustrates a sectional side view of a pad component without a load applied.
Figure 17:
FIG. 17 illustrates a sectional side view of a pad component with a load applied.

FIG. 16 illustrates a sectional side view of a pad component without a load applied and FIG. 17 illustrates a sectional side view of a pad component with a load applied. As can be seen in FIG. 17, the center portion of the pad component deflects downward. Using the auxiliary component, this deflection is decreased.

Figure 18:
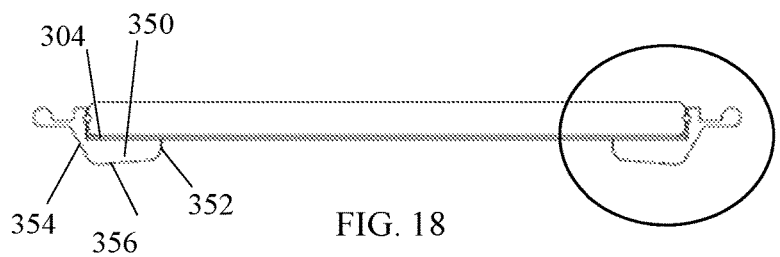
FIG. 18 illustrates a sectional side view of the pad component and auxiliary component without a load applied.
Figure 19:
FIG. 19 illustrates a detail view of a portion of the auxiliary component of FIG. 18.

FIG. 18 illustrates a sectional side view of the pad component and auxiliary component without a load applied. As shown, the bottom surface 304 of the auxiliary component 300 includes a base portion 350. The base portion 350 extends continuously around the circumference of the bottom surface 304 and includes an inside border surface 352, an outside border surface 354, and a foot surface 356. The foot surface 356 of the base portion 350 is positioned at an angle to the ground surface on which is rests as shown by FIG. 19.

Figure 20:
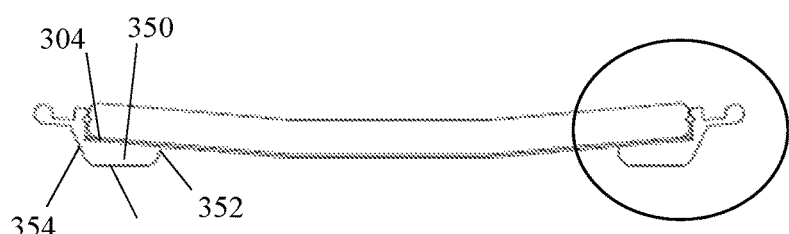
FIG. 20 illustrates a sectional side view of the pad component and auxiliary component with a load applied.
Figure 21:
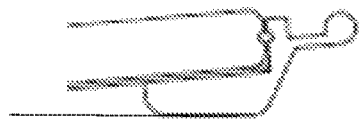
FIG. 21 illustrates a detail view of a portion of the auxiliary component of FIG. 20.

FIG. 20 illustrates a sectional side view of the pad component and auxiliary component with a load applied. When the assembly receives a load, the foot surface 356 of the base portion 350 moves to a position parallel to the ground surface as shown by FIG. 21. This compensates for the deflection of the pad component. Specifically, the load is distributed to the continuous base portion 350 extending around the circumference of the bottom surface 304. As a result, the amount of the load the apparatus can handle is not compromised.

Figure 22:
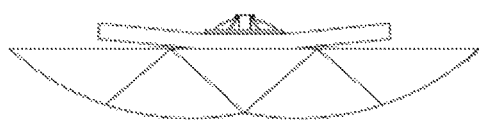
FIG. 22 illustrates a side view of the effective zones of a load applied to the pad component without the auxiliary component.
Figure 23:
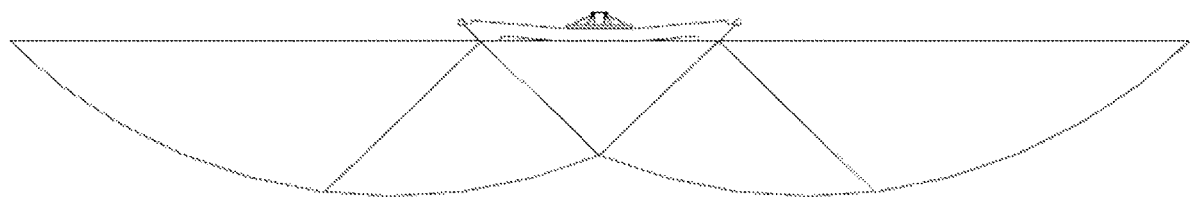
FIG. 23 illustrates a side view of the effective zones of a load applied to the pad component with the auxiliary component.
Figure 24:
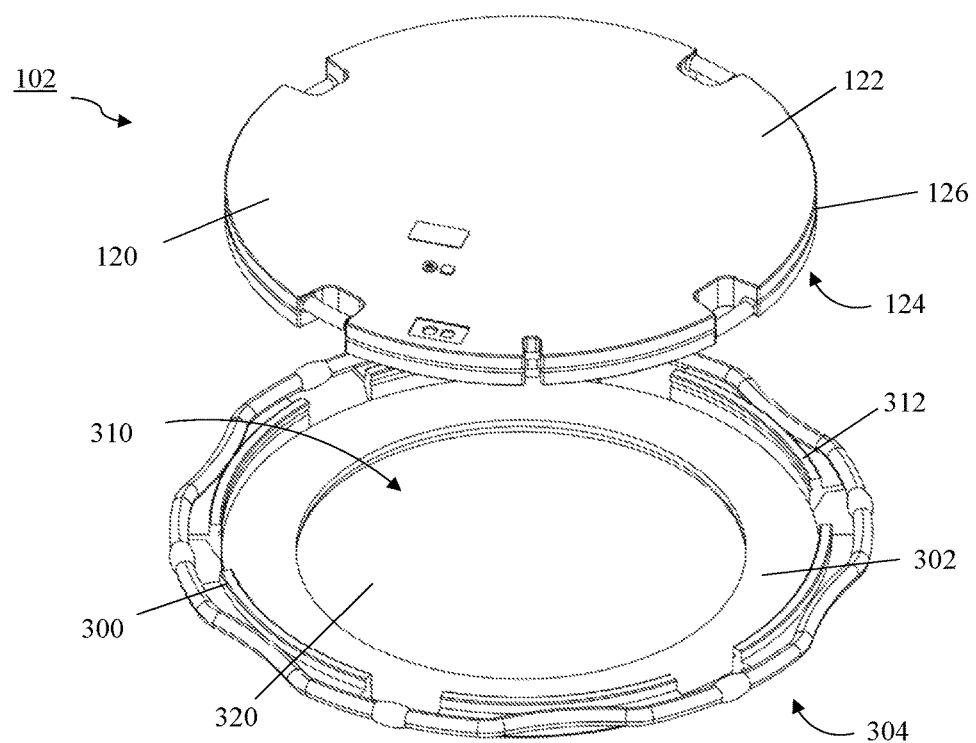
FIG. 24 illustrates an exploded isometric view of the pad component and the auxiliary component.
Figure 25:
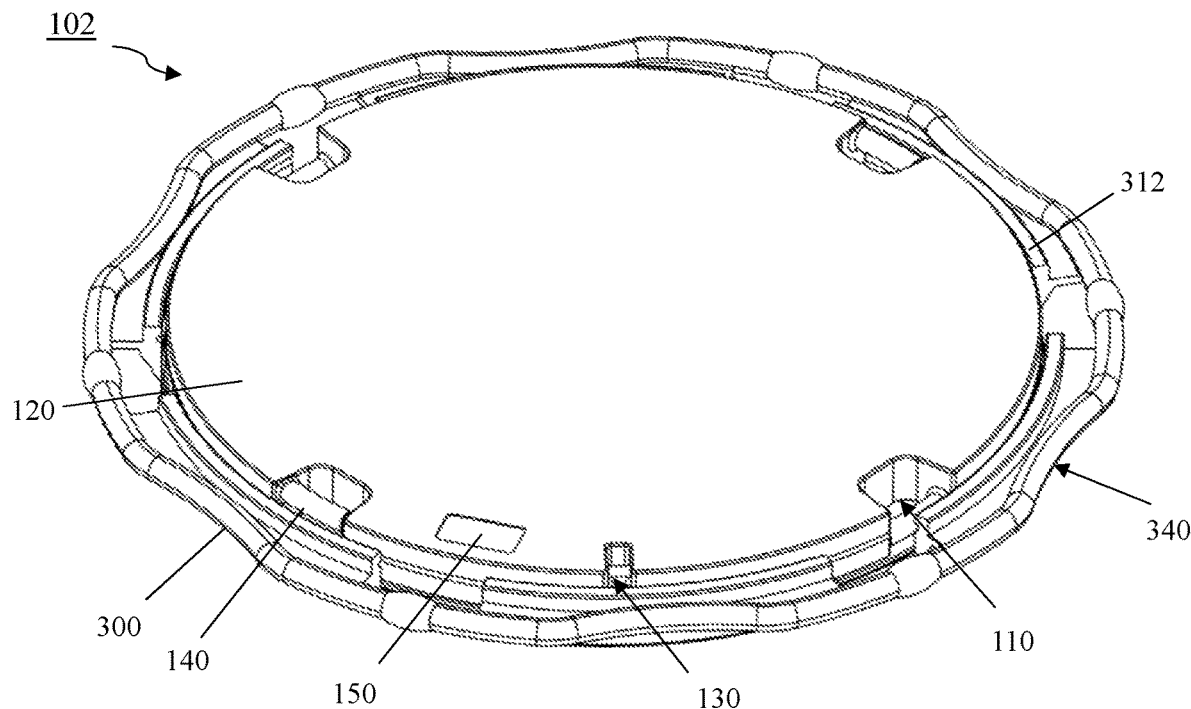
FIG. 25 illustrates an isometric view of the pad component assembled with the auxiliary component.
Figure 26:
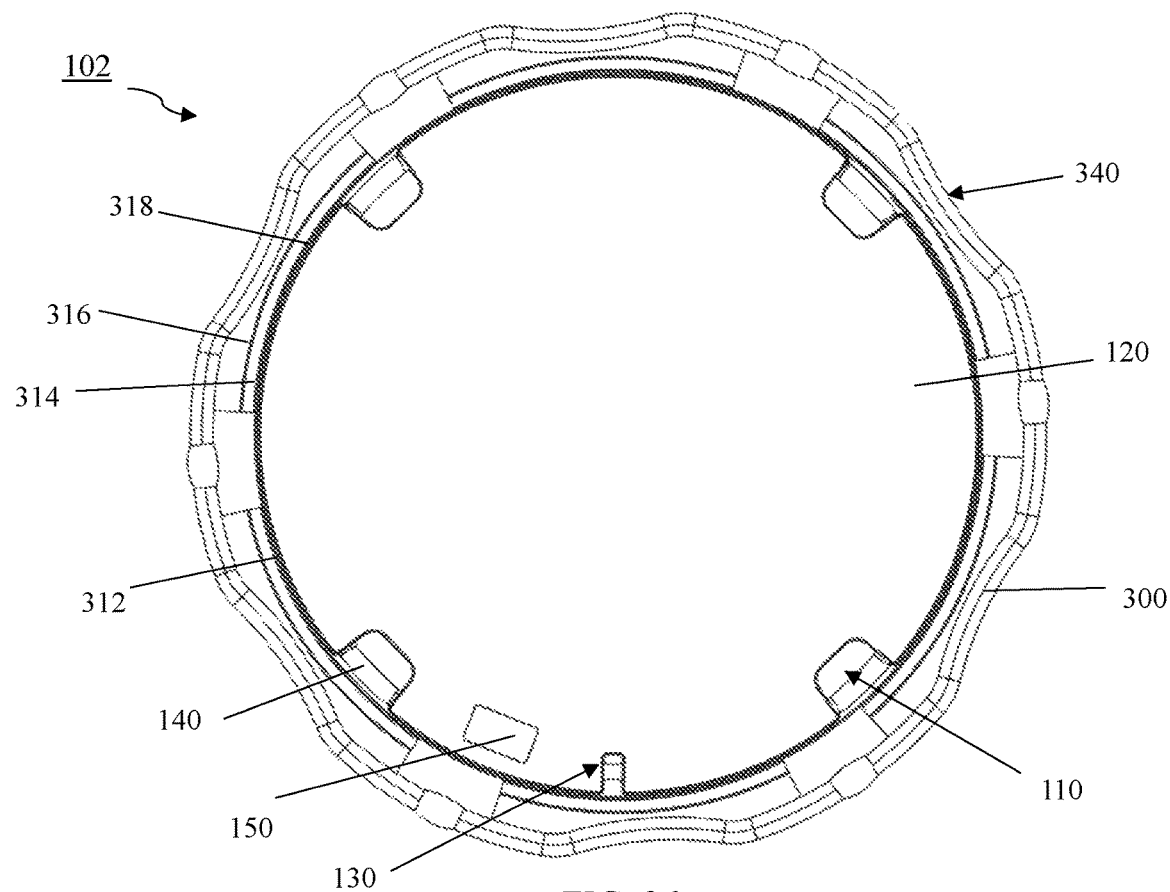
FIG. 26 illustrates a top view of the pad component assembled with the auxiliary component.

FIG. 22 illustrates a side view of the effective zones of a load applied to a pad component without an auxiliary component. FIG. 23 illustrates a side view of the effective zones of a load applied to the pad component with the auxiliary component. The effective zones may be defined as active zone, transition zone, and passive zone. As can be seen, the effective zones increase significantly by using the auxiliary component.

Figure 27:
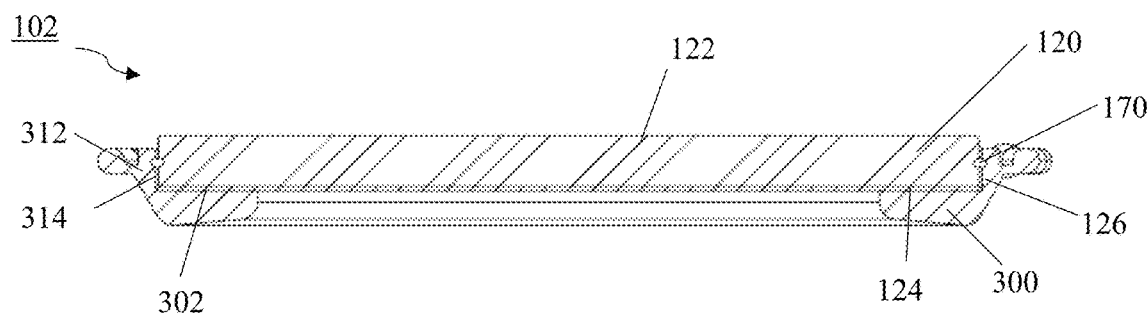
FIG. 27 illustrates a sectional side view of the pad component assembled with the auxiliary component.

FIGS. 24-27 illustrate a stabilizer pad assembly 102 comprising a pad component 120 assembled with the auxiliary component 300. As shown, the pad component 120 in positioned within the cavity element 310 of the auxiliary component 300 using a lap joint configuration. As shown in FIG. 27, side wall surface 126 of the pad component 120 is bound by inner boundary surface 314 of the wall element 312. Second surface 124 is bound by top surface 302 of the auxiliary component 300. FIG. 27 also illustrates a strip element 170 positioned on the side wall surface 126 of the pad component 120. This strip element may assist with securing the pad component 120 into the auxiliary component 300.

Figure 31:
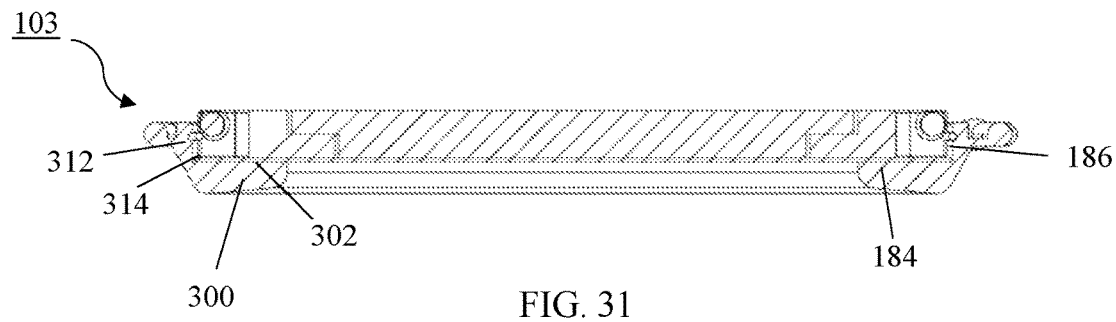
FIG. 31 illustrates a sectional side view of the outer pad component assembled with both the inner pad component and the auxiliary component.

FIGS. 28-31 illustrate a stabilizer pad assembly 103 comprising an outer pad component 180 assembled with the inner pad component 200, both assembled to the auxiliary component 300. As shown, the inner pad component 200 in positioned within the receptacle portion 190 of the outer pad component 180 using a lap joint configuration, as described in detail in reference to FIG. 11. The outer pad component 180 and inner pad component 200 are positioned within the cavity element 310 of the auxiliary component 300 using another lap joint configuration. As shown in FIG. 31, side wall surface 186 of the outer pad component 180 is bound by inner boundary surface 314 of the wall element 312. Second surface 184 is bound by top surface 302 of the auxiliary component 300.

Figure 32:
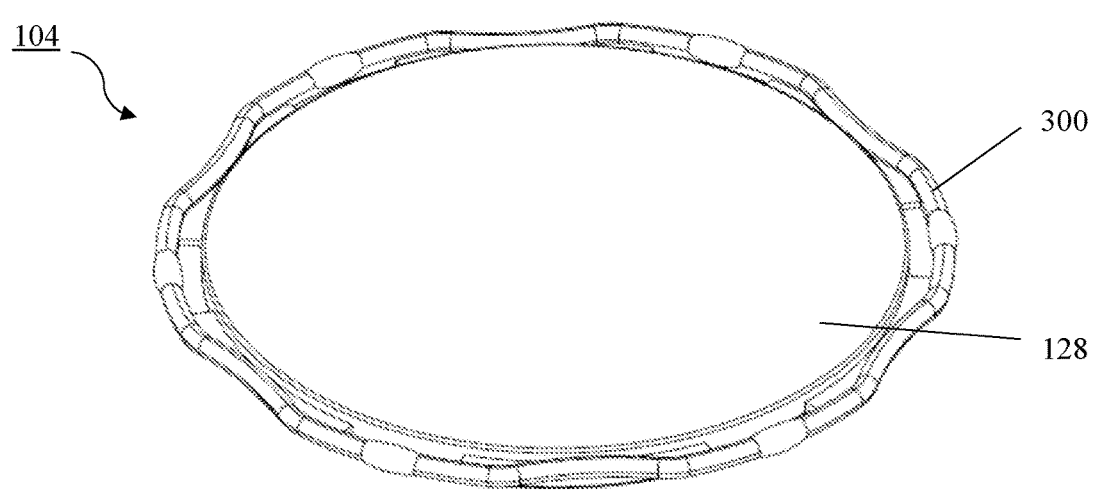
FIG. 32 illustrates an isometric view of the primary pad component integrated with the auxiliary component.
Figure 33:
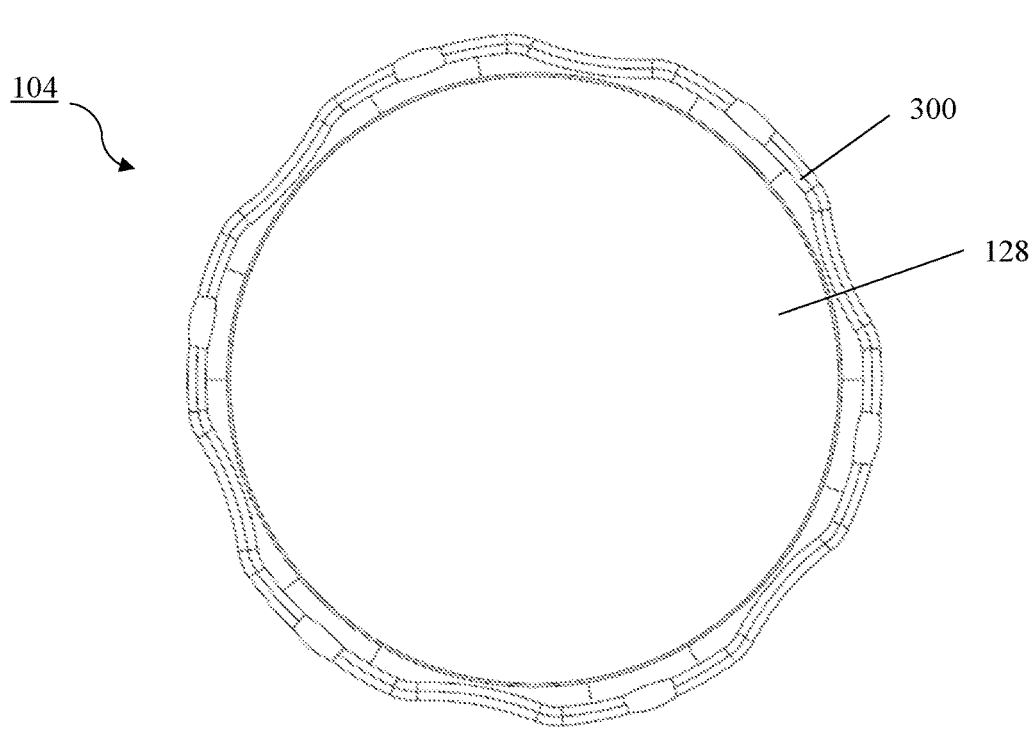
FIG. 33 illustrates a top view of the primary pad component integrated with the auxiliary component.
Figure 34:
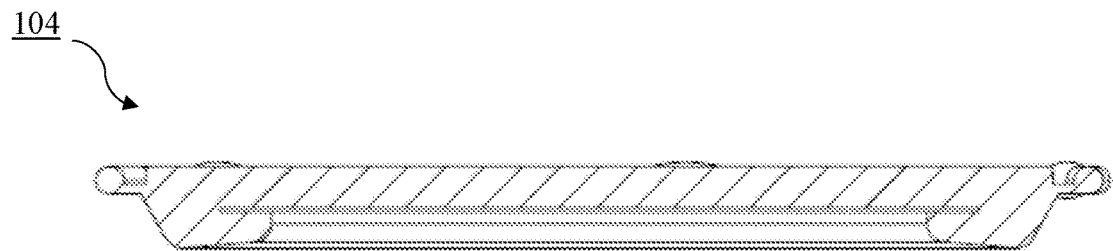
FIG. 34 illustrates a sectional side view of the primary pad component integrated with the auxiliary component.

FIGS. 32 and 33 illustrate a stabilizer pad assembly 104 comprising a pad component 128 integrated with the auxiliary component 300. In this embodiment the pad component 128 is not removable from the auxiliary component 300. FIG. 34 illustrates a sectional side view of the pad component integrated with the auxiliary component.

Figure 35:
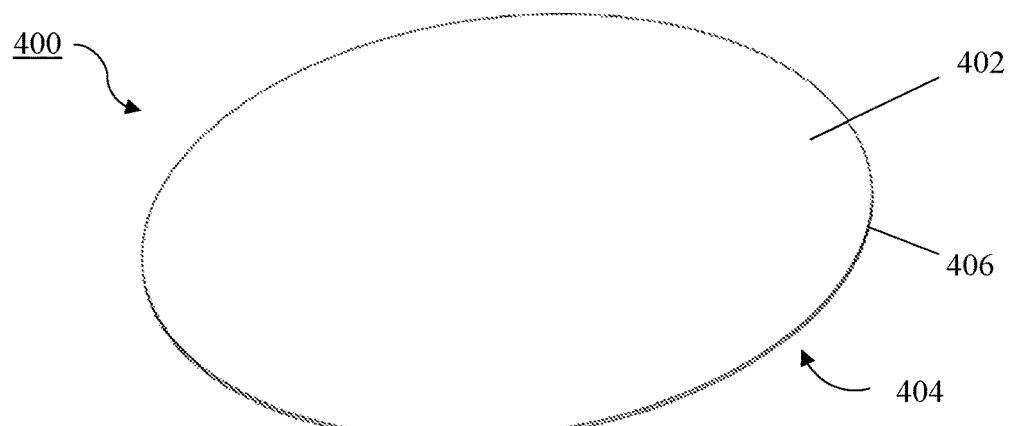
FIG. 35 illustrates an isometric view of a reinforcement component.
Figure 36:
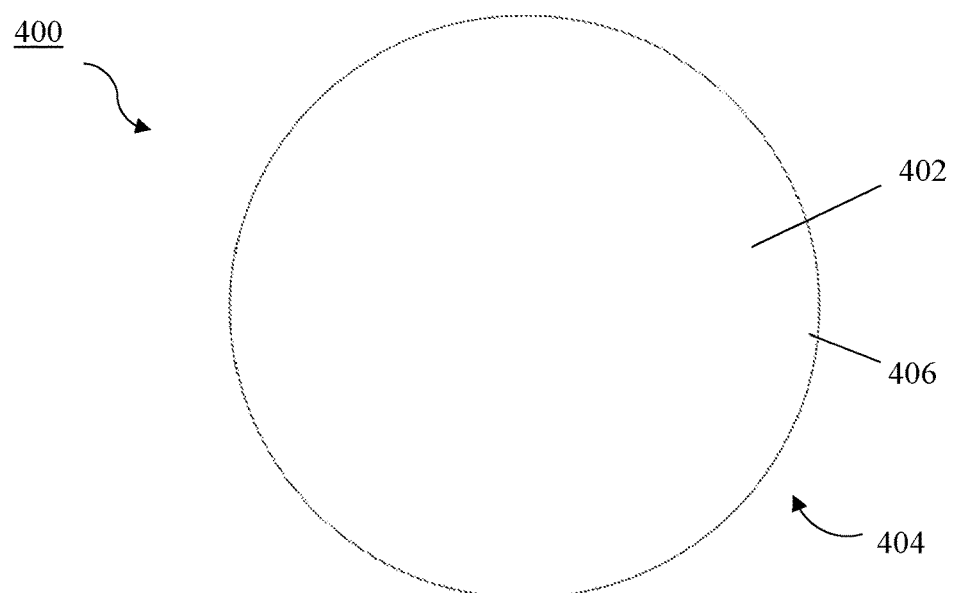
FIG. 36 illustrates a top view of the reinforcement component.
Figure 37:
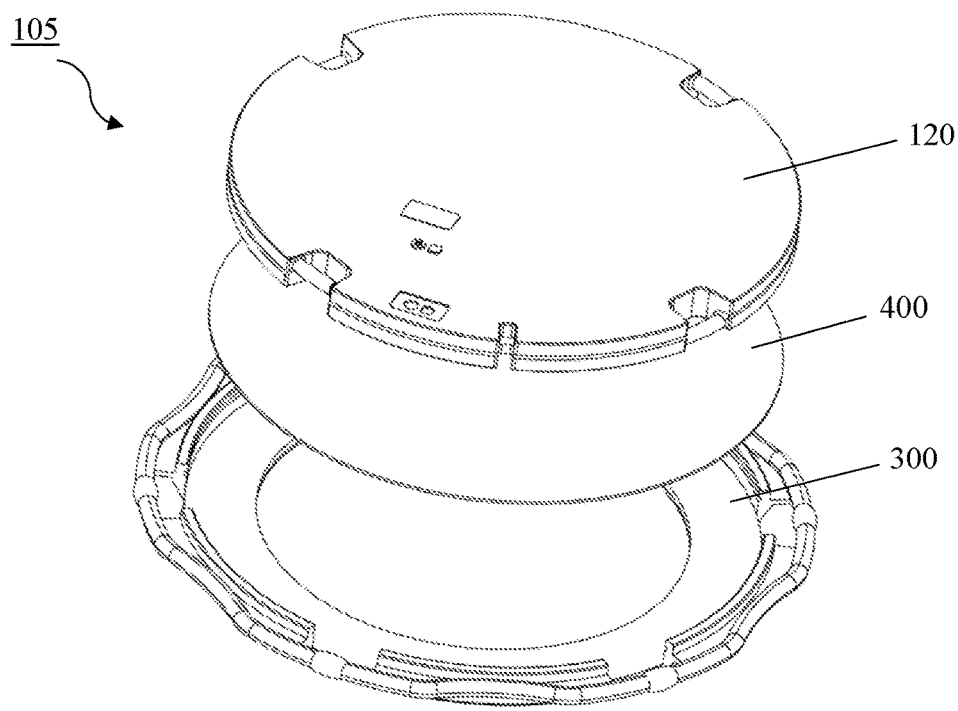
FIG. 37 illustrates an exploded isometric view of the pad component with the reinforcement component and the auxiliary component.
Figure 38:
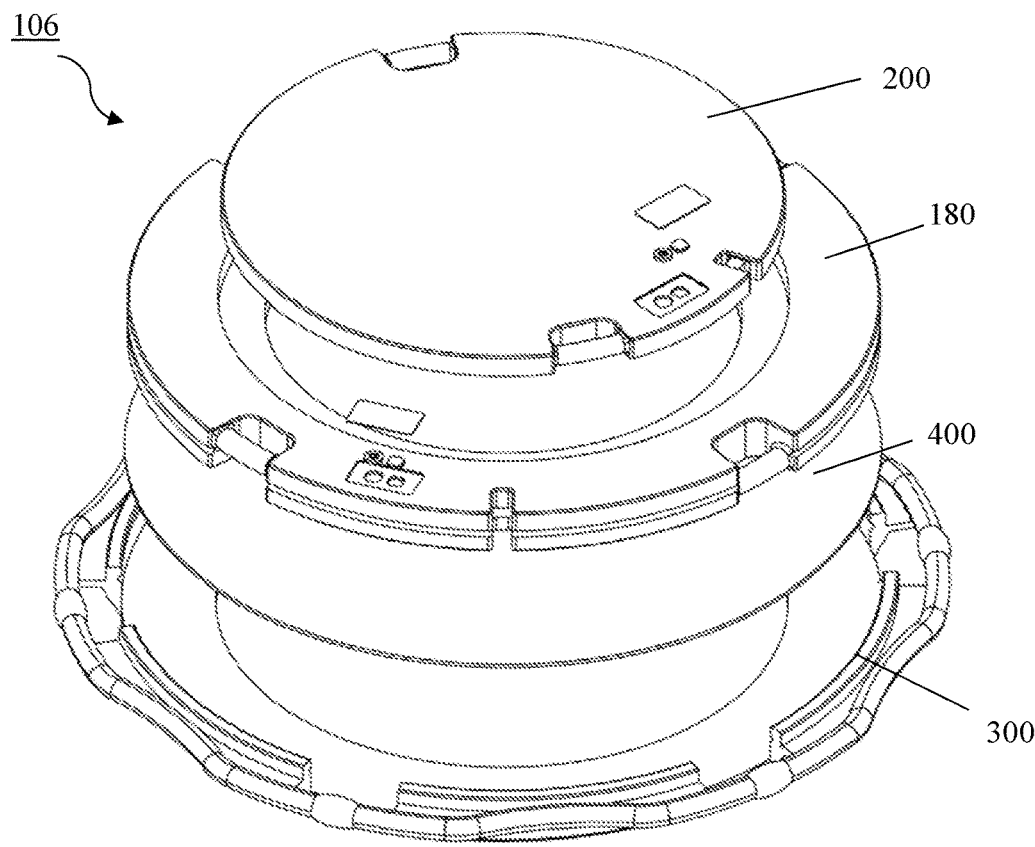
FIG. 38 illustrates an exploded isometric view of the outer pad component assembled with the inner pad component, the reinforcement component and the auxiliary component.

According to another embodiment of the invention, the stabilizer pad assembly may comprise a reinforcement component 400 as shown in FIG. 35 and FIG. 36. The reinforcement component 400 may be any pliable or rigid material, or a combination of both. The reinforcement component 400 includes a top face 402 and a bottom face 404 separated by side face 406. The reinforcement component 400 may be positioned between the ground surface and the bottom of the stabilizer pad or between the pad component and the auxiliary component to protect the pad from abrasion, punctures, and/or to decrease deflection of the pad. FIG. 37 illustrates a stabilizer pad assembly 105 including a primary pad component 120, reinforcement component 400 and auxiliary component 300. FIG. 38 illustrates a stabilizer pad assembly 106 including an outer pad component 180, inner pad component 200, reinforcement component 400 and auxiliary component 300.

Figure 39:
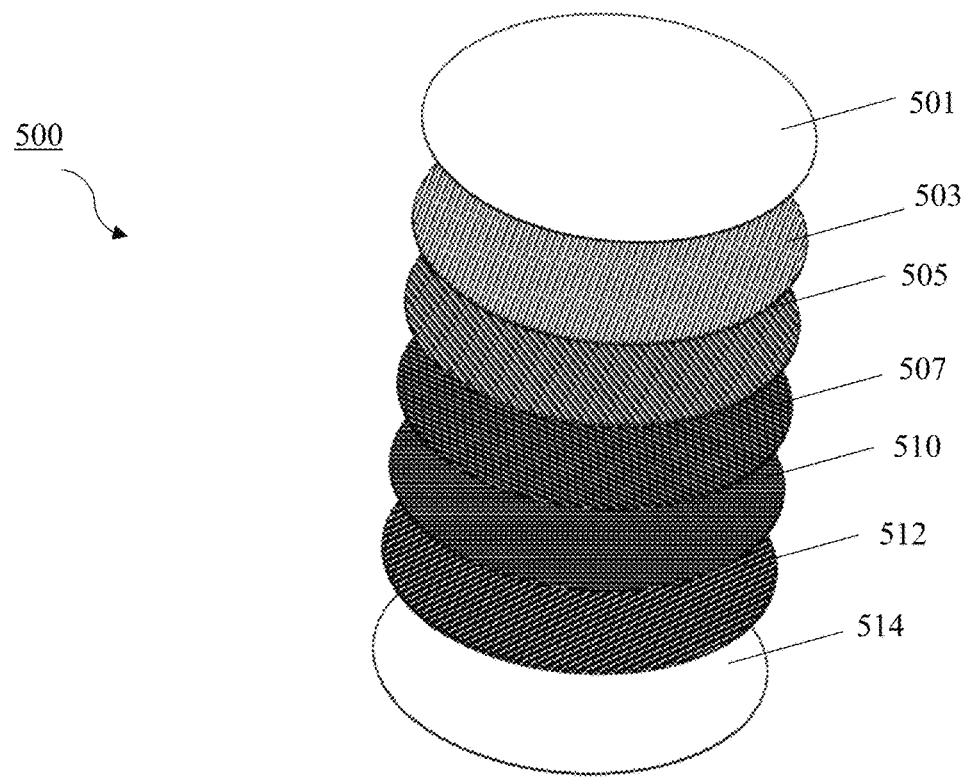
FIG. 39 illustrates an exploded isometric view of an exemplary material construction for the pad component.

FIG. 39 illustrates an exploded isometric view of an exemplary material construction for a pad component 500. Layers 503, 505, 507, 510, 512 are fabricated in a woven pattern in which the grain (i.e., longitudinal arrangement of fibers) of each material layer is positioned non-parallel to each adjacent layer. This improves the sheer factor of the pad component. As shown, the grain of one layer is positioned at approximately 30 degrees from the grain of an adjacent layer, however any angle is contemplated between 90 degrees and parallel (i.e., 0 degrees). Topmost and bottommost layers 501, 514 are used to surround and protect the pad component 500. It is contemplated that layers 501 and 514 may be constructed, for example, from carbon fiber or fiberglass.

Figure 40:
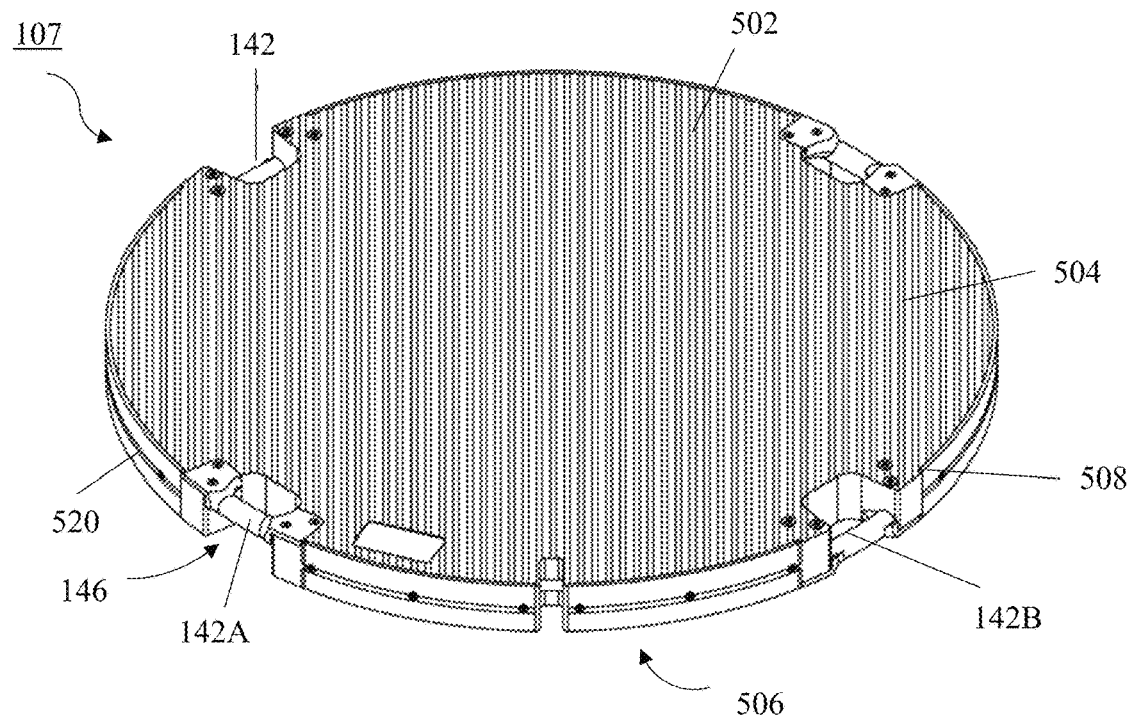
FIG. 40 illustrates an isometric view of a pad component including a band element positioned around the perimeter edge.

FIG. 40 illustrates pad component assembly 107 comprising a pad component 502 of material construction as described in FIG. 39. The pad component 502 includes a first surface 504, an opposing second surface 506, and a side wall surface 508 that forms the perimeter edge of the pad component 502. A band element 520 positioned around the perimeter edge. The band element 520 protects the side wall surface 508 of the pad component 502, and may be made from metal, plastic, rubber, etc.

Figure 41:
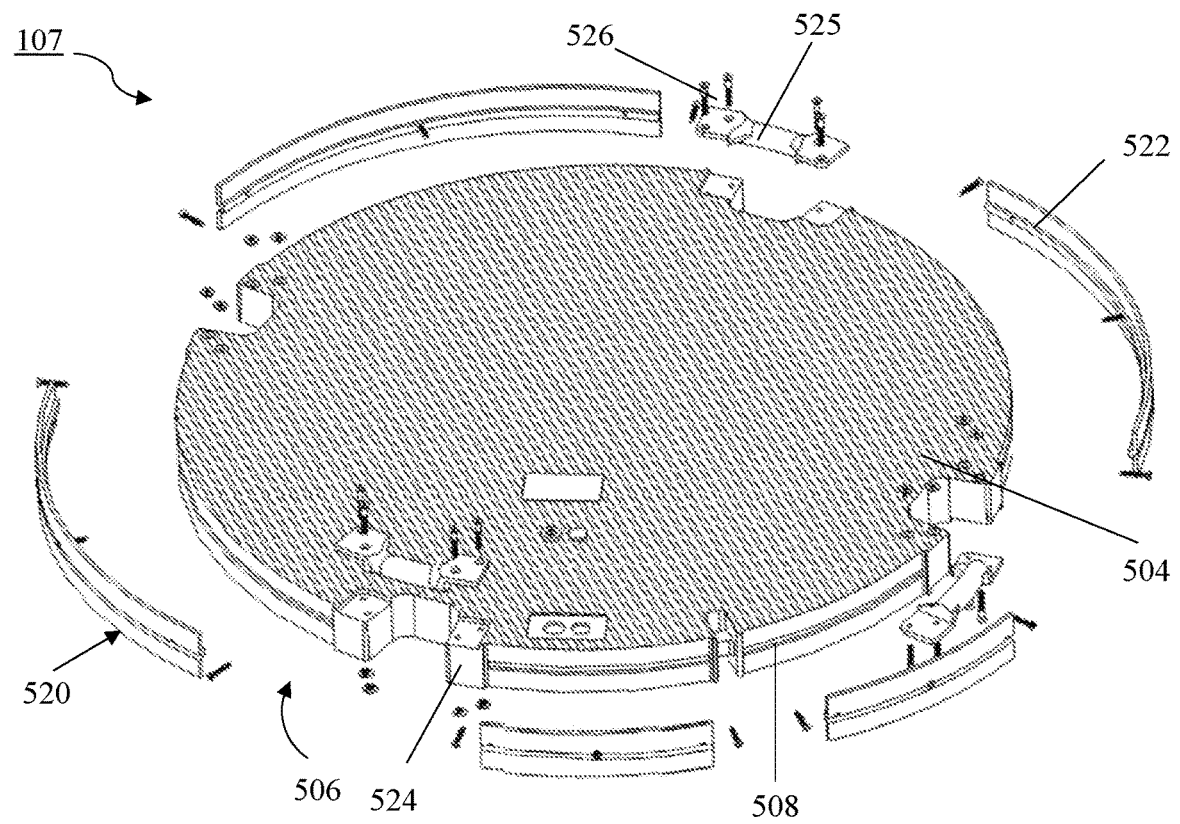
FIG. 41 illustrates an exploded isometric view of the pad component including the band element.

FIG. 41 illustrates an exploded isometric view of the pad component 502 including the band element 520. The band element comprises a plurality of individual vertical wall portions 522, a plurality of individual horizontal wall portions 524, and a handle wall portion 525. The wall portions 522, 524, 525 align with and are attached to side wall surface 508. Handle wall portions 525 are assembled to the pad component 502 to form handle element 142. The handle arrangement includes handles 142A located near a first surface 504 of the pad component 502 and handles 142B located near an opposing second surface 506 of the pad component 502. When the pad component 502 is placed on a ground surface, gaps 146 are created between the handle and the ground surface. The handles located near one surface provide a larger gap than the handles located near the opposing surface. The gaps allow space beneath and above the handle for a user to position his or her hand. The vertical wall portions 522 and the horizontal wall portions 524 are assembled to the pad component 502 using hardware elements 526, for example, screws, nails, washers, nuts, bolts, etc.

Figure 42:
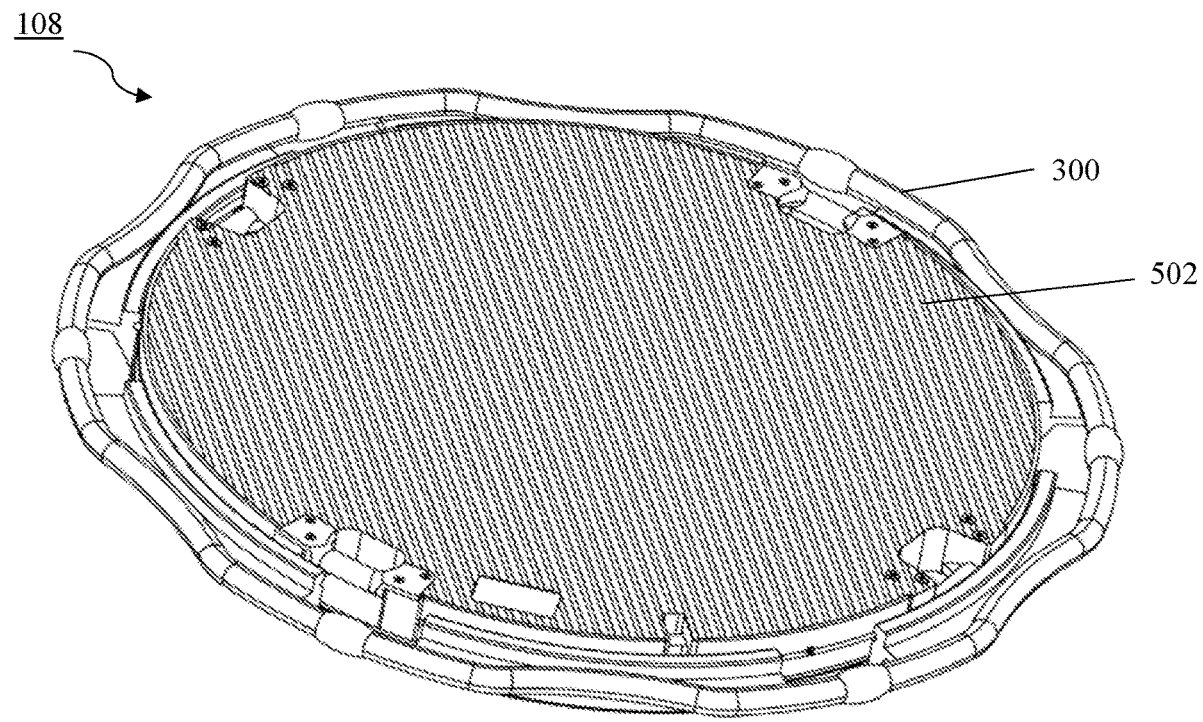
FIG. 42 illustrates an isometric view of the pad component assembled with the auxiliary component.

FIG. 42 illustrates a stabilizer pad assembly 108 comprising pad component 502 assembled with the auxiliary component 300.

Figure 43:
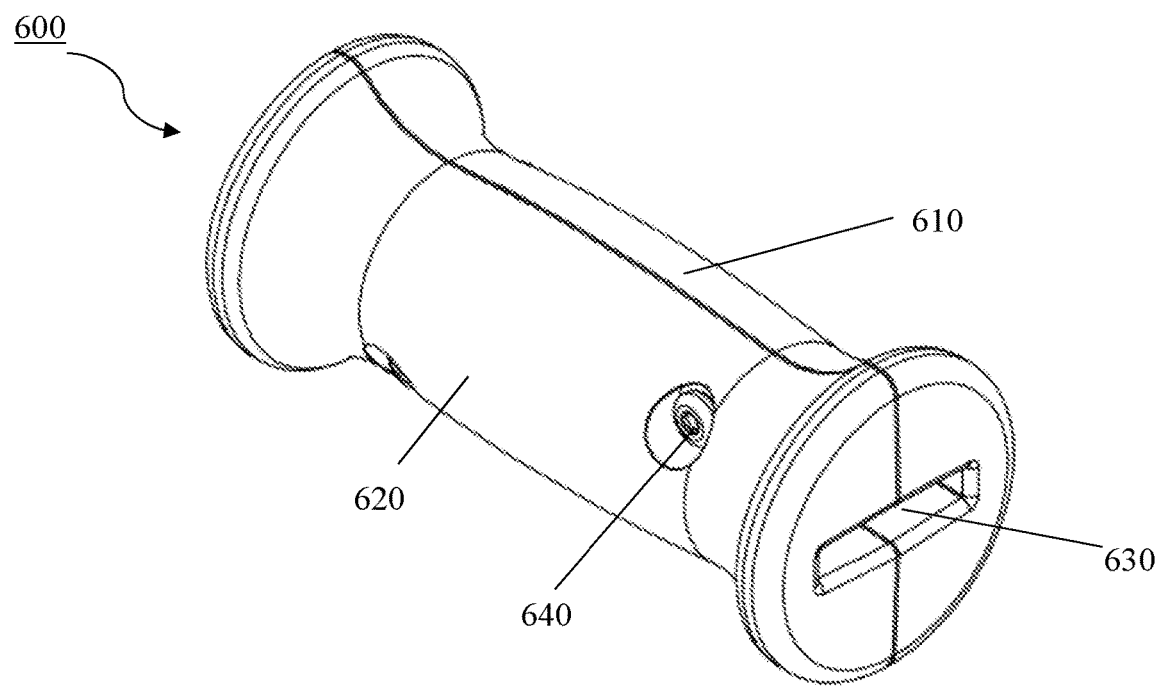
FIG. 43 illustrates an isometric view of a handgrip element.
Figure 44:
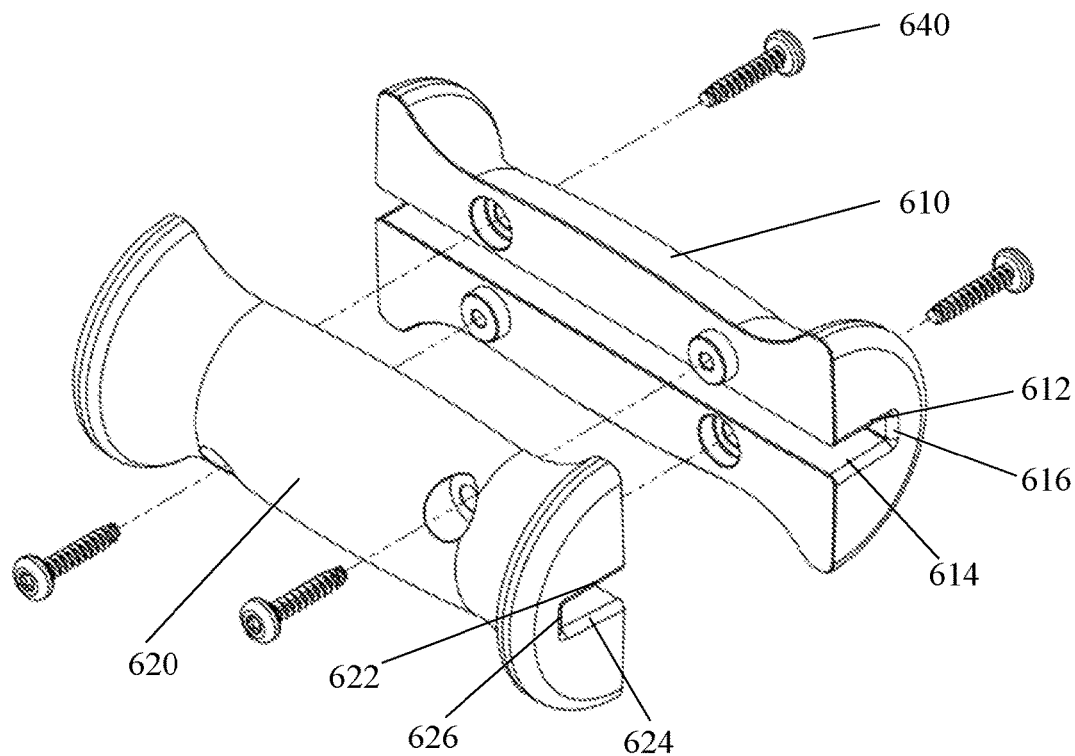
FIG. 44 illustrates an exploded isometric view of the handgrip element.

FIGS. 43 and 44 illustrate an embodiment of the handgrip element 600. The handgrip element comprise a first housing portion 610 and a second housing portion 620. The first housing portion 610 and second housing portion 620 are assembled to form a channel element 630. Although the housing portions 610, 620 of the handgrip element 600 are shown in FIGS. 43 and 44 as being assembled using hardware 640, any known method is contemplated.

As shown in FIG. 44, the first housing portion 610 includes a first top surface 612, a first bottom surface 614, and a first side surface 616. The second housing portion 620 includes a second top surface 622, a second bottom surface 624, and a second side surface 626. Once assembled, the channel element 630 is formed by these surfaces. The channel element 630 is configured to receive one or more lanyards or straps that may be used to move the stabilizer pad and apparatus of the invention. The channel element 630 is configured to provide a clearance space that permits the lanyard to move within the channel element 630 to various positions along the lanyard. The housing portions 610, 620 include ergonomic characteristics such as those relating to size, shape, texture, pattern, material composition, etc.

Figure 45:
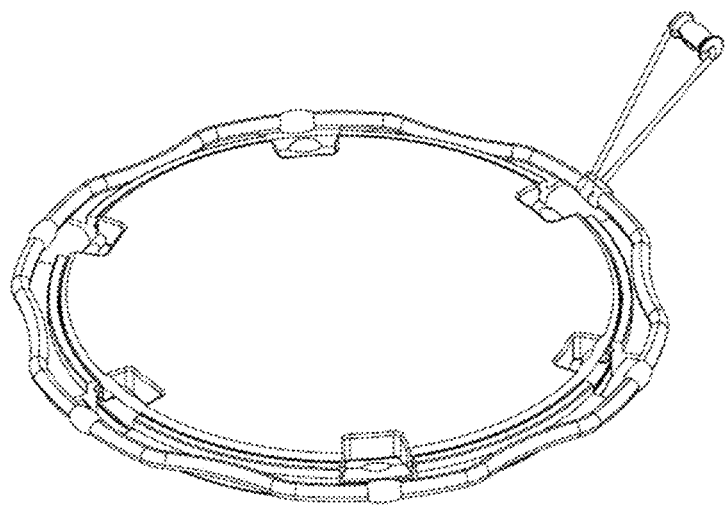
FIG. 45 illustrates a stabilizer pad assembly with a lanyard including the handgrip element.
Figure 46:
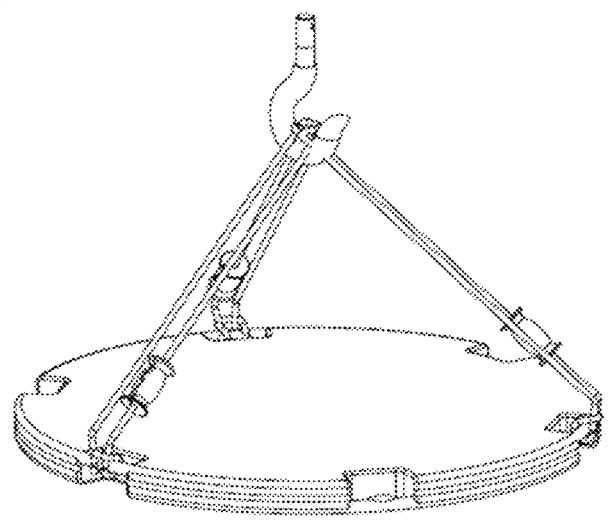
FIG. 46 illustrates a stabilizer pad with a lanyard including the handgrip element as lifted by a hook.
Figure 47:
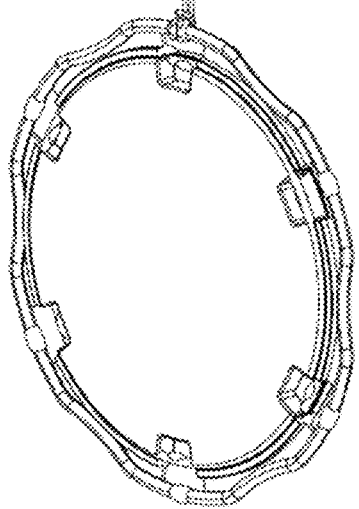
FIG. 47 illustrates a stabilizer pad assembly with a lanyard including the handgrip element as lifted by a hook.

As shown by the exemplary embodiments of FIGS. 45-47, the lanyard including handgrip element is attachable to any of the components of the invention, e.g., the pad component, the inner pad component, the outer pad component, or the auxiliary component. The lanyards are used to attach a lifting hook of a machine to move the stabilizer pad or assembly. Or the lanyards may be used to manually move or drag the stabilizer pad or assembly. Therefore, the handgrip element can be used to manually maneuver the pad or assembly as shown by FIG. 45. The handgrip element easily slides along the lanyard to avoid interference with a lifting hook as shown by FIGS. 46 and 47.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

The invention claimed is:

1. A stabilizer pad comprising:
    a pad component including:
    a first surface;
    an opposing second surface;
    a side wall surface between the first surface and the opposing second surface, and forming a perimeter edge;
    two or more recess elements, each recess element formed inward from the side wall surface and each recess element including a handle element, wherein the handle elements alternate between being located near the first surface and being located near the opposing second surface, wherein one of the first surface and the opposing second surface of the pad component is configured to be placed on a ground surface such that gaps are created by the lower part of the each handle element and the ground surface with at least one handle element providing a larger gap than an adjacent handle element, each gap configured to receive a hand of a user.

2. The stabilizer pad according to claim 1 wherein the handle elements are insert molded into the stabilizer pad component or machined from a pad material.

3. The stabilizer pad according to claim 1 further comprising a notch element formed inward from the side wall surface, the notch element comprising a body segment configured to secure a lanyard.

4. The stabilizer pad according to claim 1 further comprising a groove element extending around all or a portion of the perimeter edge the side wall surface, wherein the groove element is configured for receiving a strip element.

5. The stabilizer pad according to claim 1 further comprising a pocket element for one or more devices to provide data such as location, identification, certification, recertification, current load weight, or total load weight the pad component has supported during its lifecycle.

6. The stabilizer pad according to claim 1, wherein the pad component further comprising a receptacle portion and an inner pad component, the receptacle portion configured to receive the inner pad component.

7. The stabilizer pad according to claim 6, wherein the inner pad component comprises a planar surface and a surface comprising an elevated portion and an un-elevated portion.

8. The stabilizer pad component according to claim 6 further comprising an auxiliary component, wherein the auxiliary component includes a cavity element configured for receiving one or more of the pad component and the inner pad component.

9. The stabilizer pad component according to claim 8, wherein the auxiliary component includes a handle element comprising a continuous rim portion.

10. The stabilizer pad component according to claim 9 wherein the continuous rim portion comprises a plurality of ergonomic handgrip portions and a plurality of scallop portions.

11. The stabilizer pad component according to claim 1 further comprising a reinforcement component comprising one or more of a pliable or rigid material.

12. The stabilizer pad component according to claim 11, wherein the reinforcement component is made of rubber material and spring steel material.

13. The stabilizer pad component according to claim 1 further comprising a handgrip element including a channel element, the channel element configured to provide a clearance space permitting a lanyard to move within the channel element.

14. The stabilizer pad component according to claim 8, wherein the auxiliary component is made of rubber material.

15. The stabilizer pad component according to claim 1, wherein the pad component is made of bamboo material.

16. A stabilizer pad comprising:
    a pad component comprising two or more recess elements formed inward from a side wall surface and into each of a top surface and a bottom surface of the pad component, each recess element including a handle element, wherein a first handle element of a first recess element is located closer to the top surface and a second handle element of a second recess element is located closer to the bottom surface, wherein one of the top surface and the bottom surface of the pad component is configured to be placed on a ground surface such that gaps are created by each handle element and the ground surface with at least one handle element providing a larger gap than another handle element, each gap configured to receive a hand of a user.

17. The stabilizer pad according to claim 16, wherein the stabilizer pad further comprising a receptacle portion and an inner pad component, the receptacle portion configured to receive the inner pad component.

18. The stabilizer pad component according to claim 17 further comprising an auxiliary component, wherein the auxiliary component includes a cavity element configured for receiving one or more of the pad component and the inner pad component.

19. The stabilizer pad component according to claim 1, wherein the pad component is made of bamboo material.

20. The stabilizer pad according to claim 16, wherein the handle elements are insert molded with the pad component or machined from a pad material.

\* \* \* \* \*